United States Patent [19]
Genest et al.

[11] 4,283,710
[45] Aug. 11, 1981

[54] SECURITY SYSTEM

[75] Inventors: Leonard J. Genest, Santa Ana; Vache B. Madenlian, Huntington Beach, both of Calif.

[73] Assignees: J.S. Lock Company, Chicago, Ill.; Uniqey, S.A., Fribourg, Switzerland

[21] Appl. No.: 12,528

[22] Filed: Feb. 15, 1979

Related U.S. Application Data

[63] Continuation-in-part of Ser. No. 954,387, Oct. 25, 1978, abandoned, which is a continuation-in-part of Ser. No. 739,927, Nov. 8, 1976, abandoned.

[51] Int. Cl.³ .................. H04Q 3/00; E05B 49/00
[52] U.S. Cl. ...................... 340/149 R; 340/286 R
[58] Field of Search ....... 340/147 R, 147 MD, 149 R, 340/543, 286

[56] References Cited

U.S. PATENT DOCUMENTS

| | | | |
|---|---|---|---|
| Re. 29,259 | 6/1977 | Sabsay | 340/149 A |
| 3,761,892 | 9/1973 | Bosnyak et al. | 340/149 A |
| 3,806,882 | 4/1974 | Clarke | 340/149 R |
| 3,821,704 | 6/1974 | Sabsay | 340/149 R |
| 3,859,634 | 1/1975 | Perron et al. | 340/149 R |
| 3,911,397 | 10/1975 | Freeny, Jr. | 340/147 MD |
| 3,926,021 | 12/1975 | Genest et al. | 340/149 R |
| 3,996,449 | 12/1976 | Attanasio et al. | 340/149 R |

Primary Examiner—Donald J. Yusko
Attorney, Agent, or Firm—Fitch, Even, Tabin, Flannery & Welsh

[57] ABSTRACT

A security-system for controlling access to a locked area and updating a lock code combination memory. A central console generates lock code combinations, encodes key cards, and stores the lock code combinations. Correspondence between an authorization code combination inputted into the console, and a valid, stored authorization code combination is required to operate the console. Each lock stores a guest, station and master lock code combination. The lock opens when correspondence occurs between an inputted lock code combination and one of the stored lock code combinations. The stored guest or station combinations may be altered when an appropriately coded key card is inserted in the lock. A portable temporary security override module (TSOM) receives a security code combination and a lock code combination from the central console to enable the TSOM to be used to either open the lock, lock or unlock a double lock, or update the lock code combination by changing the guest, station or master lock code combination. A portable permanent security override module (PSOM) operates similarly to a TSOM but is adapted to receive lock code combinations from a key card rather than from the console.

50 Claims, 11 Drawing Figures

SECURITY SYSTEM

CROSS-REFERENCE TO RELATED APPLICATION

This application is a continuation-in-part of copending application Ser. No. 954,387 filed Oct. 25, 1978, which is a continuation of application Ser. No. 739,927 filed Nov. 8, 1976, both now abandoned.

BACKGROUND OF THE INVENTION

This invention relates to a security system and, more particularly, to a system for controlling a lock which governs access to a locked area and for updating the lock code combination to be responsive to different inputted lock code combinations.

Various electronic lock systems employ a key card encoded with information in a binary code which is operable to open the lock if the lock is preset to be responsive to the code combination on the card. In such systems, a user inserts the card into a receptacle associated with the lock, and the lock circuitry actuates a bolt if the code combination stored in the lock is identical to the code combination inputted from the key card. These systems are particularly useful in buildings, such as hotels, which have large numbers of rooms which must be locked but where the identity of the person having authorized access changes from time to time. In addition, such systems can be used in other similar applications, such as for locking safe deposit boxes, automobiles, or rooms in a home or suite of offices.

These devices provide significant advantages over conventional lock systems. One of the primary advantages is the large number of code combinations which may be encoded on a card of relatively small size. In addition, mechanical lock systems are generally inflexible in that changing the locks or the combination of key settings is difficult and inconvenient. In mechanical lock systems in hotels and other large buildings, a key is required for each room and the presence of a large number of keys, each of which may be stolen, presents a security problem.

Some electronic systems using key cards have attempted to overcome the deficiencies of mechanical lock systems by employing a central control unit which is electrically connected to each of the many individual door locks. The central control unit remotely sets and changes the individual lock code combinations, senses the code combination on a key card inserted in the lock, and initiates some action at the remote door lock to unlock the door. One apparent disadvantage of such central systems is the susceptibility to failure of all locks if the central control unit is inoperable. In addition, electrically wiring all individual locks to a central control unit is expensive and often inconvenient, especially in older buildings.

In other electronic systems which do not employ central control units, the individual lock code combination in each door must be reset by manually changing switches or electrical connections before a new key card will operate the lock. This type of system requires a large expenditure of time to change lock code combinations in a facility having a large number of rooms, such as in a large hotel.

It is therefore desirable to provide a security system in which code combinations, stored in the lock, can be rapidly and conveniently changed. In addition, a secure means of encoding cards must be provided in order to ensure that employee misconduct in large facilities is kept to a minimum. For the same reason, it is also desirable to provide various levels of authorization to operate all or portions of the entire system. Finally, a secure back up system is necessary in the event of failure of the central encoding means.

One particular security system is disclosed by Sabsay in U.S. Pat. No. 3,821,704 issued June 28, 1974, and reissued as U.S. Pat. No. Re. 29,259 on June 7, 1977. In that patent, a central console or controller is provided for generating the key cards to be used in the various locks. More specifically, the security system disclosed by Sabsay includes a key card which has been encoded with a code combination in response to commands from a central console to generate either a new key card or a duplicate key card. Each code combination encoded on a key card has two fields. By contrast, only one field of a code combination is stored in the lock.

In operation, if the first field of the inputted code combination corresponds with the single field code combination stored in the lock, then the lock opens. No further comparisons are done with the second field of the inputted code combination. On the other hand, if the first field of the inputted code combination does not match, the single field code combination stored in the lock and the second field of the inputted code combination, are compared. If there is a positive comparison, the first field of the inputted code combination is stored in the lock thereby causing the code combination stored in the lock to be updated to correspond to the first field of the inputted code combination. It will, of course, be appreciated that the code combination inputted to the lock in the Sabsay system must be twice as long as the code combination stored in the lock.

By contrast, in the present invention both the inputted lock code combination and the stored lock code combinations have two fields. When the initial comparison is made, both fields are utilized and must correspond in order for the lock to be activated and opened.

While Sabsay provides a basic security system, there are many problems which apparently were not recognized. One such problem relates to synchronization between the central console and the various locks. More specifically, the code combination or combinations stored in each lock must also be stored in the central console so that the code combination of the particular lock for which a key card is to be generated, may be encoded upon that key card. Thus, the code combinations stored in the central console must be synchronized with the code combinations stored in the respective locks. The problem arises if sychronization is lost. Sabsay neither recognizes nor discloses any way of resynchronizing the lock and the central console memories. By contrast, the present invention provides a means whereby a lock code combination stored in the central console can be directly stored in any one of the alterable memories of the lock. More specifically, in the present invention a portable permanent security override module (PSOM) or a portable temporary security override module (TSOM) may be utilized to cause any lock code combination stored in either the PSOM or TSOM to be directly stored into the master memory, the station memory or the guest memory upon selection of a proper function using a function switch or dial on the PSOM or TSOM. Thus, an easy means of resynchronizing a lock to the console is provided. No such feature is even suggested by Sabsay.

Another problem which is neither addressed nor apparently recognized in Sabsay, is the problem of generating key cards or otherwise accessing a lock when the console fails. For example, the console may fail by having all code combinations in its memory lost. In such a situation the Sabsay system would be unable to generate new key cards capable of opening a lock. By contrast, if all code combinations in the memory are lost in the present system, the console is used to simply generate a new code combination for each lock and then using the portable PSOM or TSOM to transfer each new code combination, so generated for each lock, to the memory of that lock.

Furthermore, the console may be down and thus incapable of generating key cards. In the Sabsay system, if a guest lost his key card and thus required a duplicate key card, the console would be unable to make one, and the guest would be unable to enter his room until the console was repaired. By contrast, in the present invention either the PSOM or the TSOM can be utilized to open the lock directly without the need of a key card. In addition, the PSOM can be utilized to "program" a lock with a lock code combination from a pre-punched key card by inserting the key card into a PSOM reader which then loads the code combination into the selected lock memory. The key card is then given, for example, to the guest.

In this connection, it should also be noted that electronic locks can be provided with a lockout switch on the inside of the room to enable an occupant of the room to disable the lock from the inside thereby allowing additional security and privacy. If such a capability is provided in the Sabsay invention and the occupant becomes disabled or otherwise requires assistance in an emergency, access to the room would not be possible because the lock-out switch would have been activated. By contrast, in the present invention, the PSOM or TSOM may be utilized to override the lock out switch and directly open the lock without a key card.

Still another problem with the system disclosed by Sabsay is that the console may be accessed and duplicate keycards may be generated by anyone since there is no built in security system for the console. By contrast, the present invention provides that only a limited number of users will have access to the console.

More specifically, console access in the present invention is provided only upon insertion of an authorization card, similar in configuration to the key cards, into a console reader. Each authorization card has an authorization code combination stored thereon. In the preferred embodiment, upon insertion of the authorization card into the console's authorization card reader, the console is turned on and the authorization code combination compared against all authorization codes (generally numbering about 64) stored in one of the console memories. If correspondence with any of the stord authorization code combinations exists, then a processor in the console looks for a binary bit associated with that stored authorization code combination. If the binary bit has a specified value, then the authorization code combination is valid. If the authorization code combination is valid then the console remains on and hence is accessed. However, if the authorization code combination is invalid then the console will record the attempted transaction and will turn off the console thus preventing any further use of the console by the unauthorized user. The present invention also provides for various levels of authorization. For example, only a selected fraction of the valid authorization code combinations will be capable of using the console to generate a master key card.

Another feature of the present invention is the double lock switch which may be utilized to lock a selected lock from the outside. If the double lock switch is activated, the lock cannot be opened by any key card. Thus, the double lock capability provides a given room with additional security when the room is not occupied as, for example, where the room contains certain valuables which the absent occupant of the room seeks to protect. As previously mentioned, if the double lock is activated then only a PSOM or TSOM will be capable of unlocking the double lock. No such additional security is suggested or contemplated by the Sabsay system.

Finally, no means is disclosed in the Sabsay patent for correcting an operator error made in generating a new key card. For example, it may be that the console operator, in generating a new key card, inserts the wrong room number or other incorrect information into the console thereby causing a key card to be generated with an incorrect lock code combination. If such an error occurs, the console will have generated an inoperative key card and will have stored a new code combination in place of the old code combination for the selected lock without preserving the old code combination. By contrast, the present invention provides a means whereby a lock code combination which has been incorrectly generated and stored may be cancelled and the original or previously stored code combinations restored. Even if such a restore capability was not provided with the present invention, the PSOM or TSOM could be easily utilized to resynchronize a particular lock to whatever code combination had been generated and stored in the console.

Thus, it will be seen that the present invention has numerous advantages and features which were neither suggested nor disclosed by Sabsay.

SUMMARY OF THE INVENTION

The present invention includes a system for controlling at least one electronic lock. Alterable and fixed memories are provided in the lock for storing code combination information. A portable means is provided which is adapted to change the lock code combination stored in the lock's alterable memory, to a new lock code combination if a security code combination, inputted into the lock, matches a security code combination stored in the lock. A central means is provided which is adapted to generate the new lock code combination upon the insertion in the central means of an authorization code combination which matches an authorization code combination previously stored in the central means.

BRIEF DESCRIPTION OF THE DRAWINGS

A complete understanding of the present invention and of the above and other objects and advantages thereof may be gained from a consideration of the following description of the preferred embodiments taken in conjunction with the accompanying drawings in which.

DETAILED DESCRIPTION OF THE INVENTION

The present invention provides a security system for a locked area. The system includes a central console, a temporary security override module (herein referred to as TSOM), a permanent security override module (herein referred to as PSOM), various key cards, and door locks having memories which are capable of being updated to make the locks responsive to different lock code combinations. The security system is especially useful where many electronic locks are used to secure individual rooms or areas in a large facility such as in a hotel or the like. Particular reference is made to U.S. Pat. No. 3,926,021, which describes one such electronic lock with which the security system of the present invention may be employed. Although only one lock will usually be referred to in describing the preferred embodiment, it will be appreciated that the system of this invention may be used with one or more locks.

Figure 1:
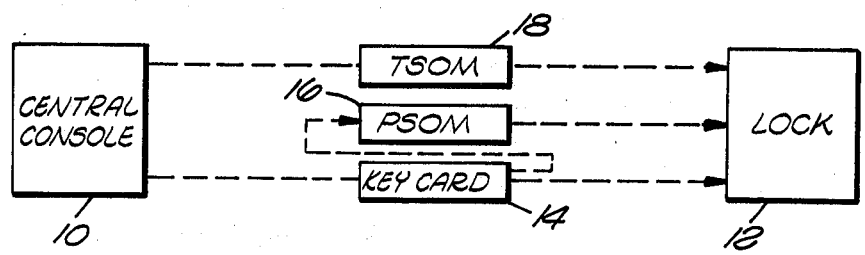
FIG. 1 is a simplied block diagram showing the relationships of the various elements of security system of the present invention.
Figure 4F:
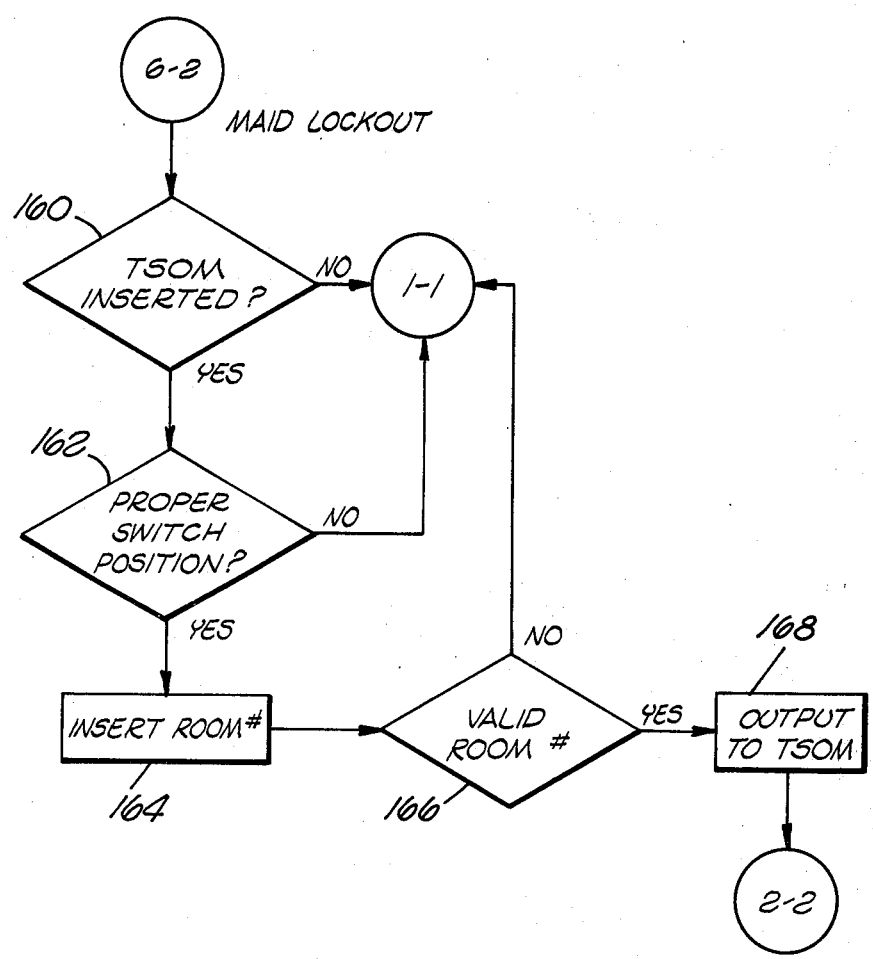
FIGS. 4A-4F illustrate a flow diagram showing the operation of the central console.

A central console 10, shown in FIG. 1, generates and stores all of the lock code combinations needed to operate a lock 12. In addition, the console 10 generates a record of all operations either performed or attempted and can encode a key card 14 or TSOM 18 with appropriate code combination information upon proper activation of the console 10. The encoded key card 14 can be used only to update the lock code combination stored in the lock memory 12 and to open the lock 12 from outside the secured area. The TSOM 18 may be encoded to perform any of the functions of opening the lock, changing the lock code combination, and locking or unlocking a double lock, to be described hereafter, which is part of the lock 12.

A PSOM 16 may also be provided to perform all the functions of the TSOM. However, the PSOM is preferably not dependent on the central console to receive code combinations and either stores code combinations permanently in an internal memory or receives code combinations from key cards through a card reader.

The operation of the central console 10 requires that an inputted authorization code combination match a valid stored authorization code combination to enable the console to perform various functions. If the inputted and stored authorization code combinations do not match, the console will reset itself, record the attempted unauthorized entry, and will power down. This security feature prevents unauthorized persons from encoding either the TSOM or a key card to enable a lock to be opened.

Figure 2:
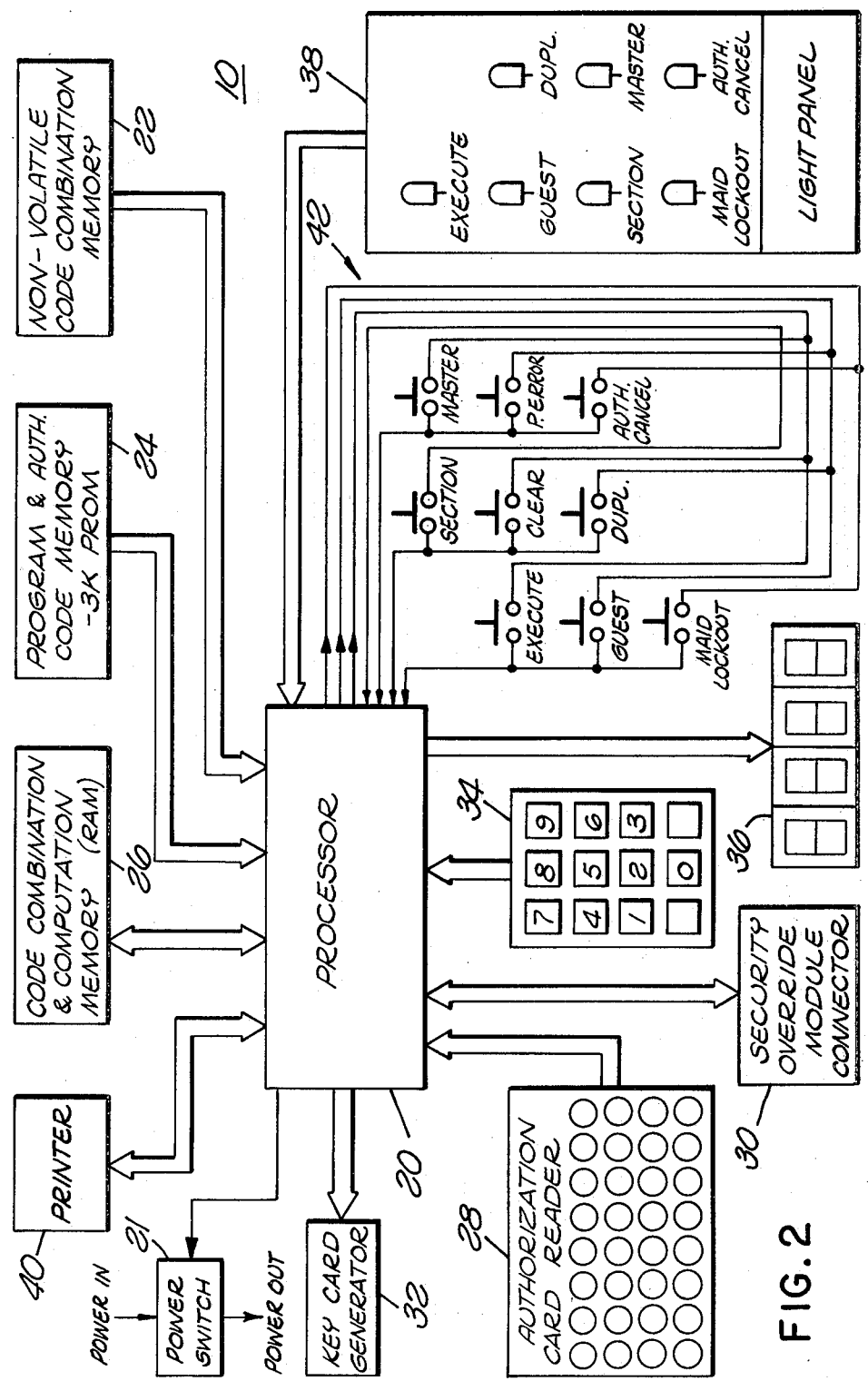
FIG. 2 is a block diagram showing the interrelationships of various elements in the central console portion of the system of this invention.

Referring to FIG. 2, the central console 10 is shown in greater detail comprising a central processing unit 20 which may, for example, be a PACE 16 bit microprocessor, which is programmed to perform various functions in response to inputs generated by the front panel of the central console. A random access memory (RAM) 26 which temporarily stores various code combinations and provides a computation memory, is coupled to the processor 20 in two way communication relationship therewith. The computation memory is simply a temporary memory useful in temporarily storing various numerical values which may be generated in the course of sequencing through the processor program steps and which may be required by a later program step. In the preferred embodiment, the RAM is a 1K (approximately 1000 8 bit binary words) memory.

Also coupled to the processor 20 is a programmable-read-only-memory (PROM) 24 in which is stored the processor program and a plurality of 32 bit binary authorization code combinations. In the preferred embodiment, the PROM 24 has a 3K storage capacity. Finally, a third non-volatile memory 22 is coupled to the processor 20 for storing the various code combinations associated with each room and with the various defined sets of rooms so that the console may be powered down without affecting the stored code combinations.

As previously indicated, the central console 10 operates only in response to the insertion of a properly and validly coded authorization card. Thus, an authorization card reader 28 is provided for receiving and reading information from an authorization card which is inserted therein.

Once the authorization code combination stored on an authorization card is read by the authorization card reader 28, the authorization code combination is transferred to the processor 20. The microprocessor 20 then compares the authorization code combination received against a plurality of authorization code combinations stored in the 3K PROM 24. Associated with each of the stored authorization code combinations in the 3K PROM 24, is a "validity" binary bit which may be set to either a one, indicating that the particular stored authorization code combination is invalid, or a zero indicating that the particular stored authorization code combination is valid. Consequently, if the authorization code combination read by the authorization card reader 28 corresponds to an authorization code combination stored in the 3K PROM 24, and the validity bit for that stored authorization code combination indicates that it is a valid authorization code combination, then the processor 20 will execute the appropriate program steps of the program stored in the memory 24 as controlled by the various input and output devices on the console panel.

Also coupled to the processor 20 is a printer 40 which records any and all attempts to access the console, whether such an attempt is authorized or unauthorized. In the preferred embodiment, the printer records not only the identity of the authorization card utilized to turn on the system, but also indicates the particular function sought to be performed regardless of whether that function is actually performed or not, Thus, it will be appreciated that the printer provides an important security feature of the present invention since it records the identity of the authorization card used to access the console as well as the identity of the function performed or attempted. The printer may also print the time of access and the data inputted through the keyboard. This feature makes secret access more difficult thus providing a deterrent to unauthorized use of the console. In addition, the printer 40 is preferably provided with a sensor which will disable the console if the printer is out of paper. One representative printer which may be utilized to perform these functions in a Texas Instruments thermal printer model number 5050.

Also coupled to the processor 20, are a plurality of panel function switches 42 which, when depressed, indicate the particular function which the processor 20 is to perform. Upon depressing one of the panel function switches 42, the processor 20 provides a command to turn on the appropriate indicator light in a light panel 38. The various indicator lights remain on at least until the function indicated has been performed.

A keyboard 34 is also provided by which specific memory locations containing code combinations may be accessed. For example, if the desired function to be performed requires the generation of a lock code combination for a particular room, a room number is entered on the keyboard 34. The entered room number is then inputted to the processor 20 which either utilizes the room number directly as a memory address to locate the particular lock code combination in the memory 22, or, alternatively, translates the number inputted via the keyboard into an address which is then used to access the nonvolatile memory 22.

In order to provide a verification that the proper address has been inputted to the processor 20 a display 36 is coupled to the processor 20 which provides appropriate signals to display the room number or other data which was inputted via the keyboard 34.

Also coupled to the processor 20 is a TSOM connector 30 into which a TSOM is inserted to receive code combination information in accordance with commands indicated by the function switches 42 and the keyboard 34.

Finally, a key card generator 32 is coupled to the processor 20 to receive lock code combination information. This information is impressed onto a key card which may then be used to open a lock or update the lock code combination of one or more locks. The key card generator may be any one of a number of well known devices such as a punch device. Of course, it will be appreciated that various interface devices will be utilized to provide compatible power levels and format transformations between the processor 20 and the various input devices and output devices. However, such devices are well known in the art and are consequently illustrated as part of the processor 20.

In the preferred embodiment, each key card is encoded by punching, or other appropriate manner, with a 32 bit binary number which is divided into two 16 bit portions or fields representing a lock code combination. In operation, the key card 14, shown in FIG. 1, may be encoded by inserting a blank card into the key card generator 32 shown in FIG. 2. Upon appropriate authorization verification and function selection, the blank card is encoded by punching a selected 32 bit lock code combination thereon. The encoded card may then be inserted into a slot in the lock 12 shown in FIG. 1 and FIG. 3, which unlocks if the lock code combination matches a lock code combination stored in one of several lock memories. In addition, the key card may also change or update the lock code combination stored in one of the lock memories. Such an updating feature is particularly useful in a security system for a large hotel.

By way of illustration, after one guest having a validly issued card checks out, the next guest is given a card with one 16 bit field of the lock code combination being the same as and one 16 bit field being different from, the previous lock code combination. The partially different lock code combination causes the lock mode combination stored in one of the memories of the lock to be altered. After that memory has been altered or updated, the lock then opens. In this manner the previously issued guest key card is automatically rendered inoperative. The particular details of the lock and its operation in conjunction with the key card is disclosed in our co-pending application Ser. No. 910,052, filed May 26, 1978, which is a continuation-in-part application of application Ser. No. 739,927, filed Nov. 8, 1976, now abandoned.

Figure 3:
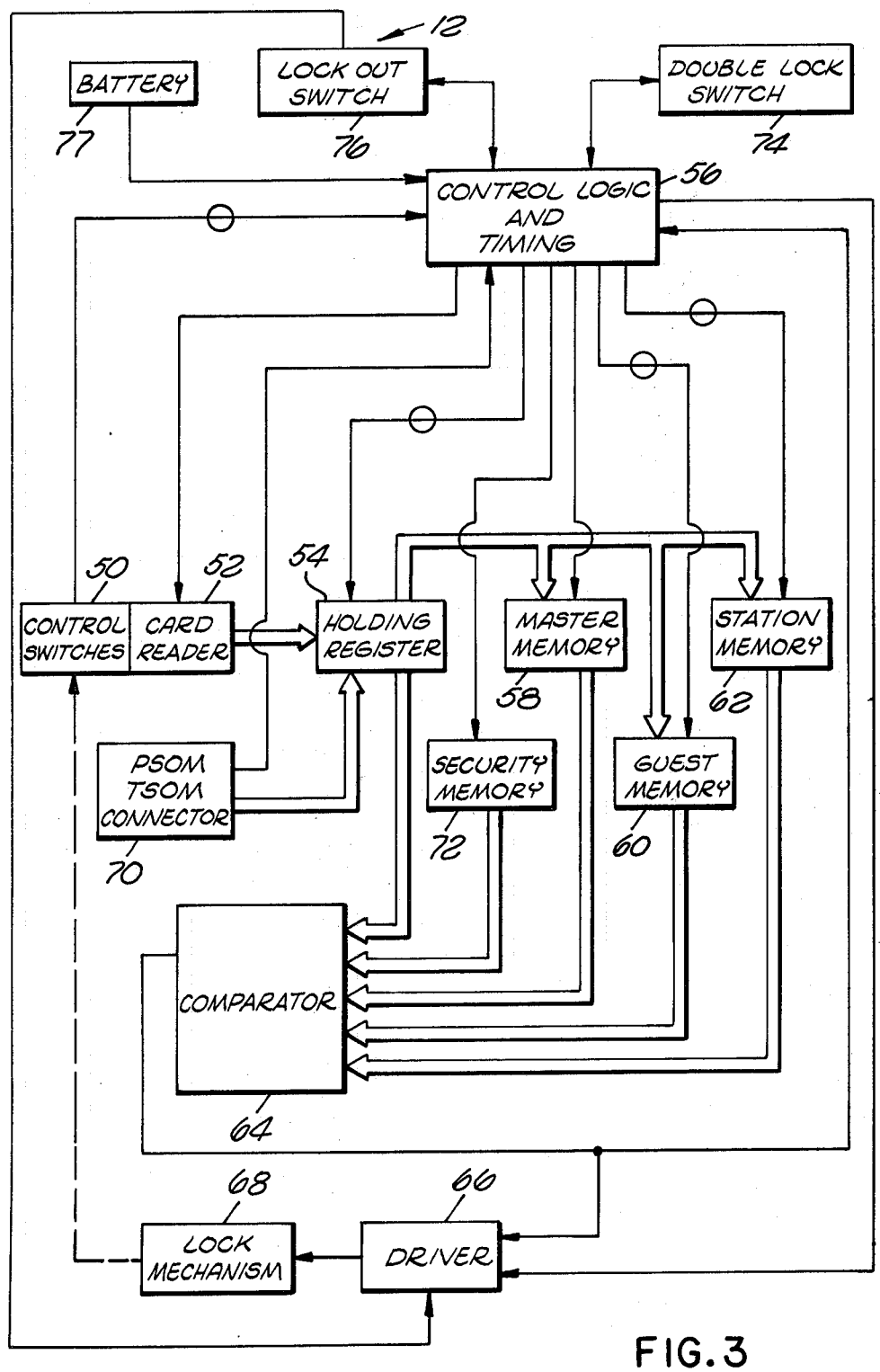
FIG. 3 is a block diagram of the various elements of the lock portion of the system of this invention.

Referring to FIG. 3, a block diagram of a lock apparatus which may be utilized in conjunction with the present invention is shown. This lock apparatus is similar to the lock apparatus illustrated in co-pending application Ser. No. 910,052 filed May 26, 1978, which is hereby incorporated by reference. However, in addition to the components described in the above identified application, the lock apparatus illustrated in FIG. 3 additionally includes a PSOM-TSOM connector 70 through which data is shifted into a holding register 54 and through which various identification and command signals are coupled to the control logic and timing circuitry 56. The PSOM-TSOM connector 70 also permits a PSOM or TSOM device to be inserted to provide an external source of power if the power source of the lock is inoperable and to provide a 3 bit binary function code combination which represents one of six functions that the lock is to perform in response to the insertion of the PSOM or TSOM. In addition, a security memory 72 is provided for storing a security code combination which in the preferred embodiment, is a permanent or fixed memory having 32 binary bits.

As described in the above identified application Ser. No. 910,052, when a key card is inserted into the card reader 52, a plurality of control switches 50 are activated to initiate a clock in the control logic and timing circuitry 56. The lock code combination stored on the key card is read by the card reader 52 and shifted to the holding register 54. In the preferred embodiment, the lock code combination is a 32 bit binary word divided into a first 16 bit portion or field and a second 16 bit portion or field. When the lock code combination on the key card has been read by the card reader 52, a counter in the control logic and timing 56 begins counting clock pulses. A hardwired programming sequence is provided by various logic gates to generate command pulses upon the occurrence of specified count values of the counter. In response to these command pulses, data in the holding register 54 are sequentially compared in a comparator 64 against lock code combinations stored in a master memory 58, a guest memory 60 and a station memory 62 until an appropriate compare pulse is generated. Upon the occurrence of the compare pulse, a driver 66 activates a lock mechanism 68 which opens the lock bolt.

Alternatively, logic in the control logic and timing 56 may generate appropriate command signals to transfer the lock code combination in the holding register 54, and store it in the master memory 58, the guest memory 60 or the station memory 62 when the lock code combination entered is newly generated and has the above described partially different format value. If the lock code combination stored in one of the memories 58, 60 or 62 is altered by the insertion of the newly generated key card, the comparison sequence is again initiated. The lock mechanism 68 will then be opened since the lock code combination stored in the holding register 54 will now match with the newly stored lock code combination in either the master memory, guest memory or station memory.

In operation, the first 32 bits of code combination data shifted into the holding register 54 by the TSOM or PSOM represents the security code combination and is consequently compared against the security code combination which may be permanently stored in the security memory 72 by hard wired connections to ground and to a voltage source or other similar means. In the preferred embodiment, this 32 bits of security code combination data will always be shifted into the holding register 54 regardless of the function the PSOM or TSOM commands the lock to perform. If the three bit function code requires that a lock code combintion be inputted to replace the lock code combination stored in the master memory 58, the guest memory 60 or the station memory 62, then after transferring the 32 bit security code combination the PSOM or TSOM will also transfer a second 32 bit binary word representing the lock code combination into the proper memory. Whether the second 32 bits, representing the lock code combination, is required will depend upon the 3 bit function code stored in the PSOM or TSOM and inputted to the control and logic timing 56 through the TSOM and PSOM connector 70.

Once the code combination data, whether just the 32 bit security code combination or the 32 bit security code combination plus the 32 bit lock code combination, is transferred from the PSOM-TSOM connector 70 to the proper alterable memory, the control logic and timing 56 initiates a command which causes the security code stored in the security memory 72 to be transferred to the comparator 64 where it is compared with the first 32 bits of information stored in the holding register 54 which represents the inputted security code combination. If there is correspondence, then the comparator 64 generates a signal which is coupled to the control logic and timing 56 which then accepts the three bit function code and initiates a sequence of programmed steps to perform the function associated with that function code.

For example, the 3 bit function code transferred from the PSOM or TSOM may command the lock to immediately open thereby eliminating any need for lock code combination comparisons. Similarly, the function code may be decoded by the control logic and timing 56 to generate a lock or unlock command to a double lock switch 74 to be described hereafter. In each of the above three cases, i.e., to open the lock mechanism, or to lock or unlock the double lock switch 74, only the proper 32 bit security code combination is required to enable the indicated function to be performed.

In the preferred embodiment, three additional function codes are provided to enable a new code combination to be stored into the master memory 58, the guest memory 60 or the station memory 62. For each of these functions, an additional 32 bit lock code combination is provided by the TSOM or PSOM through the connector 70.

The ability to store a new lock code combination in one of the lock memories is necessary in those situations where the lock code combination of a particular lock has gotten out of synchronization with the lock code combination stored in the memory 22 of the console 10. By transferring the lock code combination stored in the console into a PSOM or TSOM, the lock which is out of synchronization can be synchronized by transferring the second 32 bits of information, representing a new lock code combination, directly into one of the lock memories. Such a transfer will occur upon the generation of an appropriate enable signal by the control logic and timing 56 in response to inputting an appropriate function code from the PSOM or TSOM.

A lock-out switch 76 may also be provided to be actuated from inside the locked area to, for example, disconnect the driver 66 from the lock and thereby prevent entry from outside using a key card. The lock-out switch 76 may be reset by the room occupant opening the lock from inside, or by the PSOM or TSOM.

The double lock switch 74 may also be provided to be both actuated and reset only by the PSOM or TSOM. In other respects, the double lock switch 74 may be configured to operate similarly to the lock-out switch 76. The purpose of a double lock is to allow the lock to be disabled from outside the locked area to provide additional security for valuables left in a room while the occupant is not there. If a double lock is locked, it is impossible to open the lock from the outside even with a valid master key card, without the use of the TSOM or PSOM to unlock the double lock. This feature is particularly important to prevent unauthorized entry into a room by the facility's personnel or by a person who obtains unauthorized possession of the guest's key card.

Referring again to FIG. 2, the TSOM 18 is connectible to the central console 10 at the TSOM connector 30 to receive and store information to be used in accessing, opening and updating code combination data for the lock. The TSOM is portable and has its own power supply. Once information is loaded into the TSOM from the central console, it may be disconnected from the central console and later connected to the appropriate lock to perform any of the functions of opening the lock, locking or unlocking the double lock switch, and updating a lock code combination stored in the master memory, guest memory or station memory of the lock.

The PSOM 16 is a battery powered, self-contained unit and is an integral part of the security system of the present invention. However, unlike the TSOM 18, the PSOM 16 is not dependent upon the central console 10. Instead, the PSOM has its own fixed memory and card reader and is adapted to receive coded key cards. Upon being connected to the lock, the PSOM performs any of the functions of opening the lock, operating the double lock to lock or unlock the double lock, and updating the lock code combinations stored in the locks alterable memories.

Another feature of the present invention is the use of the security code combination which must match the security code combination stored in the security memory 72, before the lock will respond to any other information provided by the PSOM or TSOM. The use of one or more security code combinations prevents an unauthorized TSOM 18 or PSOM 16 from being used. For example, each lock in a group of locks, such as all the locks on one floor of a hotel, may be made responsive to a specific unique security code combination. If the security code combination to which the locks respond does not match the security code combination inputted from the PSOM or TSOM, no further lock operations will occur.

More specifically, in the preferred embodiment, each lock is responsive to three different types of lock code combinations received by the card reader 52 in FIG. 3. For example, a key card may have a lock code combination which corresponds to the lock code combination stored in the master memory 58. The same lock code combination is stored in the master memory of a large group of locks, such as all of the locks in one hotel. In a similar manner the lock code combination stored on the key card correspond to the lock code combination stored in the station memory in each of a subgroup of locks, such as all the locks on a floor or all of the locks of a group of rooms to be serviced by one person. If such is the case, then the key card will open any of the locks in that subgroup. In the event that the lock code combination of the key card corresponds to the lock code combination stored in the guest memory 60, then the key card is operative to open the lock of only one room since the lock code combination stored in the guest memory of each lock is unique.

Typically, both the key card and the authorization card utilized to access the console are elongated, rectangular strips folded together to enclose a central layer of coded material. The central layer is preferably composed of a thin sheet of metal, such as aluminum or the like, which is secured to one-third of a piece of non-metallic, electrically insulating materials, such as plastic or the like. After the key card is encoded at the central console, such as by removing portions of the central layer in a predetermined pattern in accordance with the lock code combination stored in the central console, the plastic material is folded and laminated together to enclose the coded central metal layer between two outer plastic layers. The authorization cards are normally encoded at a remote location, such as at the lock factory.

The PSOM-TSOM connector 70 may be part of the reader 52 or may be a separate connector and is adapted to receive an electrical connector of the TSOM or PSOM. In one embodiment of the invention, both the PSOM and TSOM carry male connecting printed circuit boards which are adapted to be connected into a female slot in the PSOM-TSOM connector 70.

More specifically, in the preferred embodiment, when the lock of FIG. 3 is to be opened utilizing a key card, various control switches 50 are activated by the physical insertion of the card into the card reader 52. The control logic and timing circuitry 56 and the card reader 52 combine to accomplish the transfer of a 32 bit lock code combination to the holding register 54. Thereafter, under the control of the congtrol logic and timing circuitry 56, the 32 bit lock code combination in the holding register 54 is sequentially compared against the 32 bit lock code combinations stored in the master memory 58, the guest memory 60 and the station memory 62. If a correspondence exists between a stored lock code combination and the inputted lock code combination, then the comparator 64 generates a signal which activates the driver 66 and the lock mechanism 68 to open the lock. If a partial correspondence exists, indicating that a new 32 bit lock code combination is to be stored in one of the lock's alterable memories, then a signal from the comparator 64 will be generated and sent to the control logic and timing circuitry 56. The control logic and timing circuitry 56 will then generate a signal which enables the lock code combination stored in the holding register to be transferred to the appropriate master, guest or station memory to replace the lock code combination previously stored in that particular memory. Various techniques may then be incorporated to cause the lock to open. For example, in a preferred embodiment, the lock code combination stored in the holding register is again sequentially compared against the stored lock code combinations in each of the memories 58, 60 and 62. However, since the lock code combination stored in the holding register 54 will be the same as the lock code combination just stored in the master, guest or station memory, a comparison will necessarily occur and the comparator 64 will generate an appropriate signal to activate the lock mechanism 68 to open the lock.

It will be appreciated that when a key card is utilized to open the lock, a 32 bit security code combination and 3 bit function code combination are not required. By contrast, when a PSOM or a TSOM is inserted into the connector 70, a 32 bit security code combination will be first inputted to the lock and compared against a security code combination stored in the fixed security memory 72. Correspondence between the inputted security code combination and the stored security code combination from the security memory 72 must occur before any further function will be performed by the lock. Such a comparison may be accomplished by transferring the 32 bit security code combination into the holding register 54 and thereafter, under the control of the logic and timing circuitry 56, transferring the inputted security code combination from the holding register 54 and the stored security code combination from the security memory 72, to the comparator 64. If the comparator 64 generates an appropriate compare signal, the control logic and timing circuitry 56 will be enabled and will continue functioning.

Once the security code combination comparison test is passed, the 3 bit function code is received by the control logic and timing circuitry 56, causing the control logic timing circuitry 56 to perform a selected series of steps to accomplish the commanded function. For example, if the 3 bit function code combination indicates that the lock is to be opened directly, then no 32 bit lock code combination is required and none is transferred into the holding register 54. Instead, the control logic and timing 56 generates a signal which is inserted directly to the drive 66 to open the lock by activating the lock mechanism 68.

Each lock is self-powdered, preferably by a battery. However, batteries eventually go dead or otherwise fail, thus rendering a lock inoperative. Consequently, the PSOM and TSOM each has its own power supply which is coupled to an output powder lead on the PSOM or TSOM connector 150 (FIG. 6) or 220 (FIG. 5) respectively. This output power lead is coupled to the various components of the lock through the PSOM-TSOM connector 70 (FIG. 3). For simplicity, such coupling is not explicitly shown in FIG. 3. However, the power of the TSOM or PSOM may be coupled in parallel with the battery 77 shown in FIG. 3. Alternatively, an interrupt switch (not shown) could be provided which would disconnect the battery 77 from the remaining components of the lock whenever a PSOM or TSOM was inserted in the PSOM-TSOM connector 70. Thus, whenever a TSOM or PSOM was used, the battery 77 would be overridden and power would be supplied to the lock solely by the PSOM or TSOM.

If the 3 bit function code combination indicates a lock-the-double-lock function is to be performed, then the control logic and timing 56 will generate a signal which is coupled to the double lock switch 74 to cause the double lock to be locked. Once the double lock switch has been activated, the room will be locked and will thereafter be accessible only upon the insertion of a PSOM or TSOM which has a 3 bit function code combination set on the unlock-the-double-lock position. If such a PSOM or TSOM is inserted into the PSOM-TSOM connector 70 then the control logic and timing will sense that 3 bit function code combination and generate a signal which will cause the double lock switch to be activated to unlock the double lock.

When the 3 bit function code combination generated by the PSOM or TSOM in the connector 70 indicates that a new master lock code combination, a new guest lock code combination or a new station lock code combination is to be inputted, then a 32 bit lock code combination in addition to the 32 bit security code combination will be inputted to the lock. If the 3 bit function code combination transferred to the control logic and timing circuitry 56 indicates that the 32 bit lock code combination is a master code combination, the control logic and timing circuitry 56 will generate an appropriate signal to transfer the new code combination directly to the master memory 58 to replace the prior code combination stored therein. In a similar manner, a new guest code combination and a new station code combination may be transferred into the guest memory 60 and the station memory 62, respectively.

It will be appreciated that only when the 3 bit function code combination is such that the OPEN function is to be performed, is the lock mechanism 68 activated. All other functions performed by the TSOM or the PSOM do not activate the lock mechanism 68 and consequently, do not cause the lock to be opened.

Reference has previously been made to changing, altering or updating the alterable guest, station or master memories of the lock 12. This updating will be described with respect to one alterable memory, although it will be understood that updating any of the three memories may occur in accordance with the described procedure. Alternatively, in one embodiment of the invention, the master memory may be interconnected so that the lock code combination stored therein can only be changed by use of a PSOM or TSOM which merely inserts a new lock code combination into the master memory 58.

Each alterable memory has at least two storage regions for storing two data fields, herein referred to as $M_1$ and $M_2$. Each key card is also encoded with at least two data fields, herein referred to as $C_1$ and $C_2$. The number of binary elements encoded on a key card is the same as the number of binary elements encoded on the associated data field in any one alterable lock memory.

The lock comparator 64 compares the lock code combination in the lock memories with the lock code combination received from the key card to determine if there is a correspondence between the stored and the inputted lock code combinations. If there is correspondence, the lock opens. If no correspondence is indicated, the lock determines whether the key card is encoded to update the stored lock code combinations in one of the alterable lock memories to be responsive to a different inputted lock code combination. If it is, then the lock code combination from the key card causes the stored lock code combination from one of the memories to be updated with a new lock code combination. The new stored lock code combination is then tested for correspondence. Such correspondence will necessarily exist if the updating has been properly done. Hence, the lock opens.

This procedure may be performed in various sequences of steps. Two preferred sequences are shown in the following table.

| Step | Sequence I | Sequence II |
| --- | --- | --- |
| 1 | Compare $C_2$ with $M_2$ | Compare $C_1$ with $M_1$ |
| 2 If match in step 1, | Open and terminate | Open and terminate |
| 3 If no match in step 1, | Compare $C_1$ with $M_2$ | Compare $C_1$ with $M_2$ |
| 4 If no match in step 3, | Terminate | Terminate |
| 5 If match in step 3 | Change $M_1$ to $C_1$ and $M_2$ to $C_2$ and return to step 1 | Change $M_1$ to $C_1$ and $M_2$ to $C_2$ and return to step 1 |

In the preferred embodiment, $C_1$, $C_2$, $M_1$ and $M_2$ are each 16 binary bits in length. Representative apparatus which may be utilized to perform similar detecting and updating functions is described in detail in U.S. Pat. No. 3,926,021.

Referring again to the detailed block diagram of the central console shown in FIG. 2, the lock code combinations and the 32 bit security code combination may be provided by simply storing a set of externally generated random binary numbers in the non-volatile memory 22. Alternatively, a pseudo-random number generating subroutine may be incorporated internally to generate random numbers. In one embodiment, a 32 bit random number is stored in a memory location identified by a unique memory address. In order to access the memory and encode a key card or TSOM with that code combination, the address at which the code combination is stored is inputted into the processor 20 via the keyboard. Alternatively, a room number may be inputted with the processor 20 decoding the room number to identify the appropriate memory address.

In the preferred embodiment of the invention, 64 authorization code combinations, each 32 bits in length, are stored in 64 addressable memory locations in the 3K PROM memory 24. An additional validity bit associated with each of the 64 addresses indicates whether the particular authorization code combination stored in that memory location, is valid or invalid depending on whether the validity bit is a "one" or a "zero." It will be recognized that a validity bit may be changed to thus invalidate or validate the authorization code stored at that address.

In operation, when an authorization card is read by the authorization card reader 28, the processor 20 sequentially compares the authorization code combination read with each of the 64 stored authorization code combinations. If a match occurs, then the validity bit associated with the stored authorization code combination is sampled to determine if that stored authorization code combination is valid or not. If it is valid, then the console is accessed and may be used. If the stored authorization code combination is invalid, then the console power is turned off. For example, if an employee having an authorization card is terminated and does not return his authorization card or if an authorization card is stolen, the validity bit associated with the authorization code combination stored in the console memory can be changed and that authorization code combination invalidated, even though still stored in memory. As previously indicated, an invalidated authorization code combination will not enable the console.

The authorization card and reader may be similar to the key card reader of the lock and may be a device similar to that described in U.S. Pat. No. 3,926,021. An appropriate authorization code combination is required so that only certain authorized personnel are able to make certain types of key cards, such as master cards, station cards or guest cards or to transfer data to a TSOM.

For example, a desk clerk at a hotel will have an authorization card capable only of making a new guest key card. Such an authorization card is inserted into the authorization card reader 66. The control panel 78 may then be operated to perform the encoding for a new or duplicate guest key card. A person, such as a hotel manager who has a higher level of authorization, will possess an authorization key card which enables the central console 10 to make new master key cards as well as new guest key cards or to perform any other function programmed to be performed by the higher level authorization.

In the preferred embodiment, each authorization card has two fields of data. One field contains a code combination identifying the level of authorization and the identity of the individual who is supposed to possess the authorization card, and a second field containing a random binary number.

The console memory 24 may also store a 32 bit security code combination which corresponds, for example, to the security code combination stored in the security memory of all of the locks of the hotel. Alternatively, the security code combination may be permanently stored in the memory in the PSOM or TSOM. In another embodiment, a plurality of different security code combinations may be provided with each security code combination being stored in each of a subgroup of security memories in the locks. The subgroup may include one or more locks.

If the security code combination is stored by the processor memory 24, the security code combination may be stored in the TSOM by inputting the appropriate room number or memory address via the keyboard and inserting a TSOM into the TSOM connector 30. The processor 20 will then transfer the 32 bit security code combination for that subgroup of rooms to the TSOM memory. The above sequence occurs, of course, only if a proper authorization code combination has first activated the console.

As previously indicated, the central console 10 includes a security printer 40 which records all of the operations of the central console on a paper tape or the like. Power is supplied to various panel components through a power switch 21 which is turned on or off by the processor 20 under program control.

The preferred operation of the central console 10 may be explained by reference to the flow chart of FIGS. 4A through 4F in conjunction with FIG. 2. According to the convention adopted for the flow diagram herein, the diamonds represent information to be supplied or questions asked regarding various logic conditions and the information or answers determine the paths to be taken to the next step. Thus, the words "YES" or "NO" is written adjacent to the arrows extending from each diamond to indicate the logic condition or how the question contained within the diamond has been answered and the resulting path to be followed. The rectangles contain steps performed or instructions given to the various logic or memory elements involved, and the step or instruction is presumed to be carried out without decision at that position in the flow diagram. The arrows on the connecting lines indicate the direction of flow of the steps through the diagram.

Figure 4A:
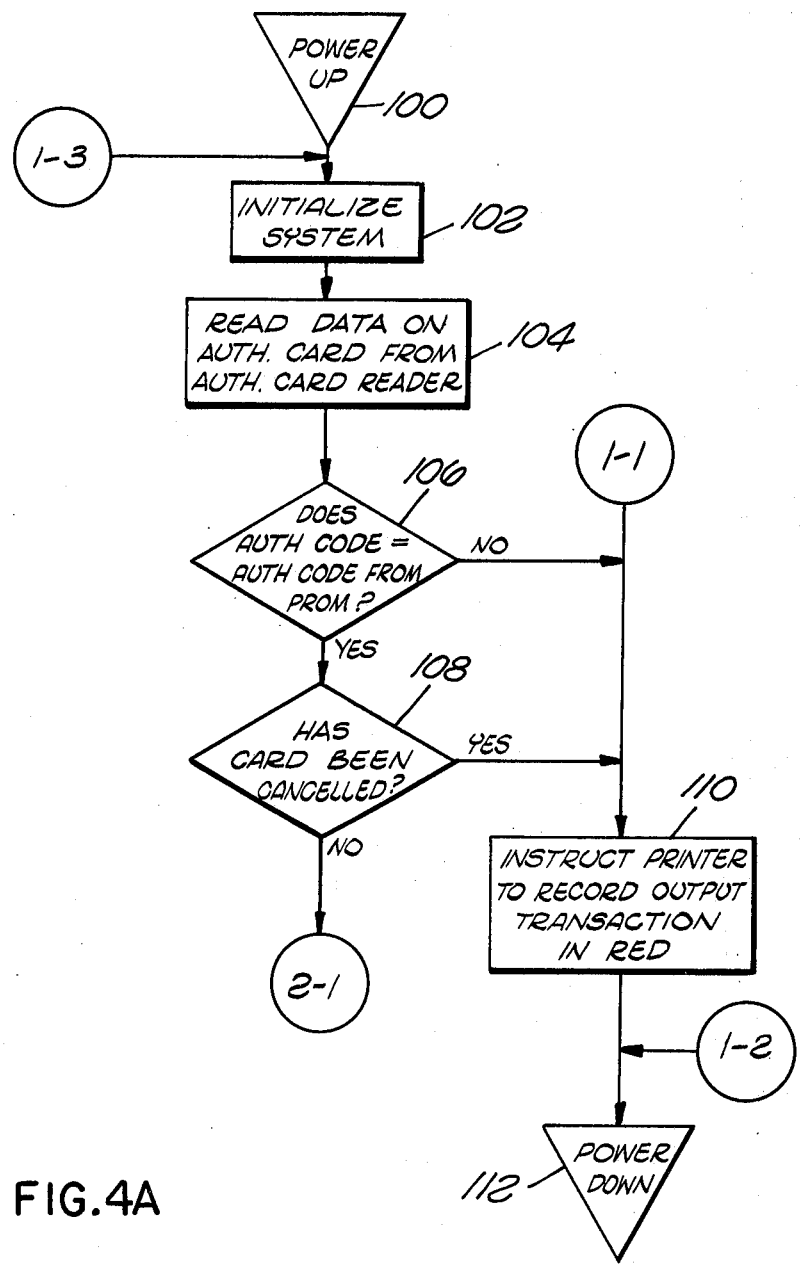

In FIG. 4A, the beginning point 100 represents connection of the console to the exterior power source. In order to enable the console, a start switch on the control panel is activated, for example, by physically inserting the authorization card into the authorization card reader 28. The processor 20 then sends appropriate initialization signals to the input, output and indicator devices of the console 10 as indicated by block 102.

After initializing the system (block 102), the processor 20 commands the authorization card reader 28 to read the authorization code combination from the authorization card (block 104). The processor 20 then determines whether the authorization code combination matches a stored authorization code combination from the PROM memory 24 (block 106). If the inputted authorization code combination matches, then the processor tests the validity bit (block 108) to determine if that authorization code combination has been cancelled. If the authorization code combination has either been cancelled or does not correspond to a stored authorization code from the PROM memory 24, then the printer 40 is commanded to record the authorization code combination in red (block 110) and then to turn off the console (block 112).

Figure 4B:
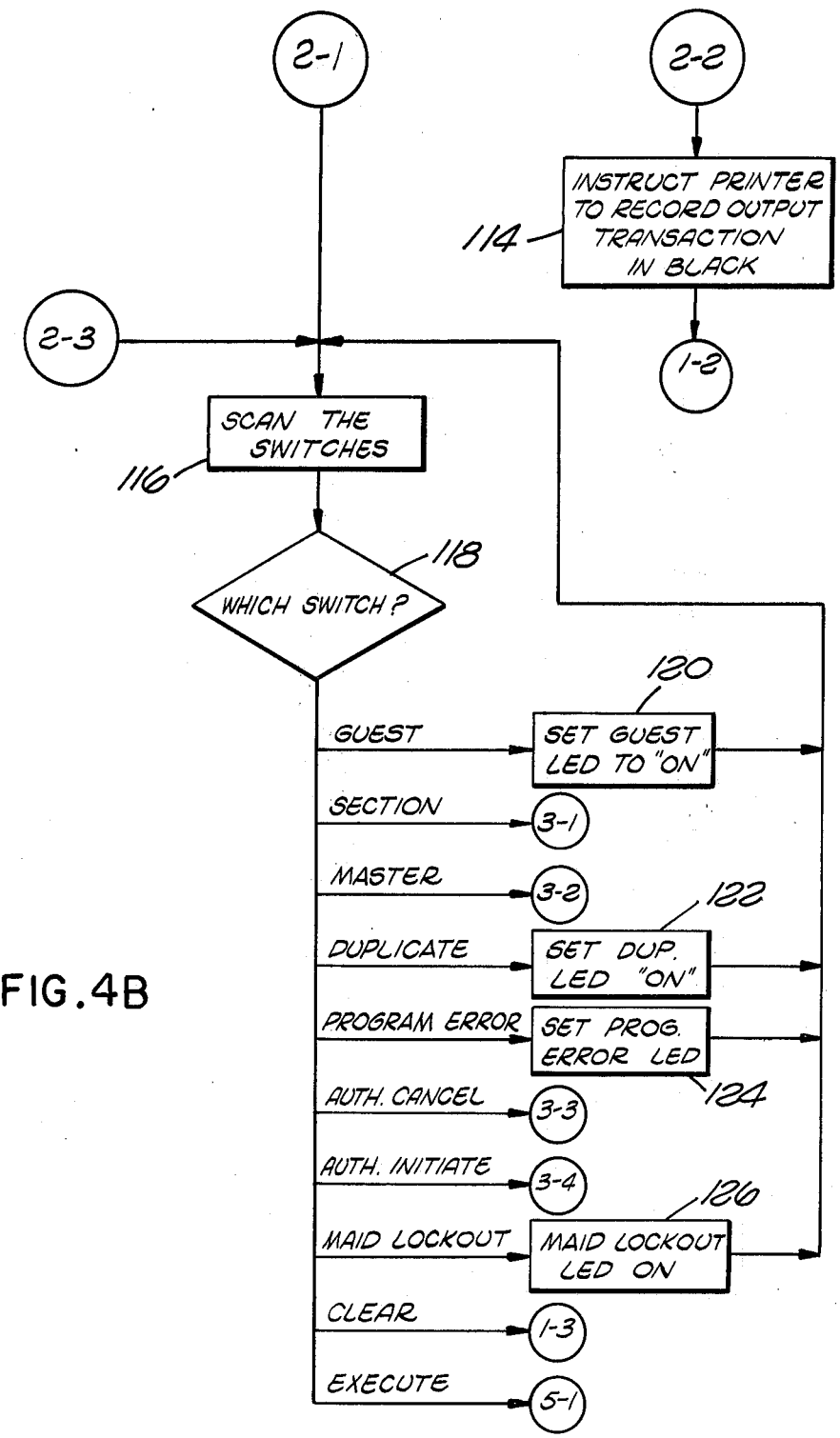

If the inputted authorization code combination corresponds to an authorization code combination stored in the PROM 24, and that authorization code combination has not been cancelled, then the processor 20 scans the plurality of switches 42 (FIG. 2) to determine which, if any, of the switches has been depressed (see blocks 116 and 118 of FIG. 4B). If one of the switches 42 have been depressed, the processor 20 as a result of the above described scanning, will generate a command signal which turns on an appropriate corresponding indicator light in the indicator light panel 38.

Figure 4C:
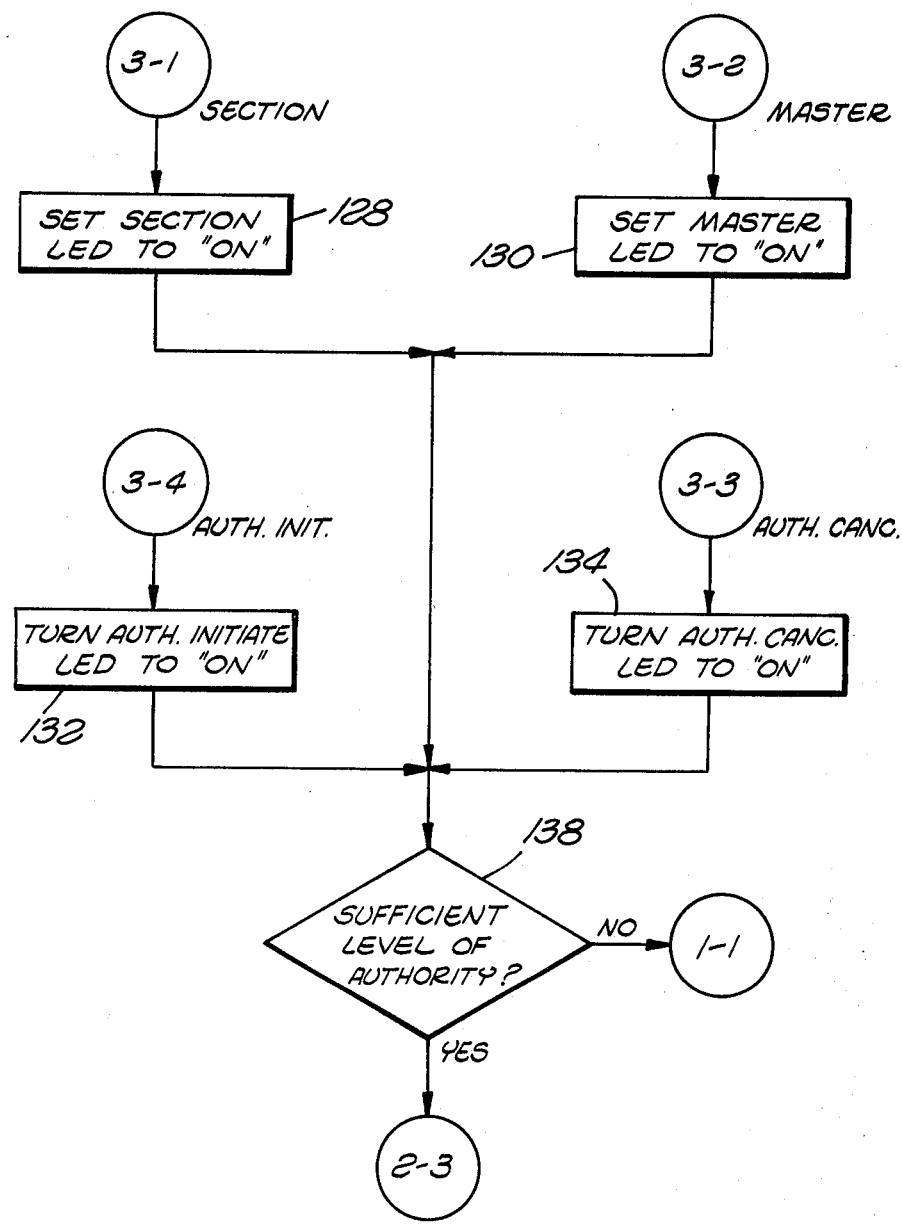
Figure 4D:
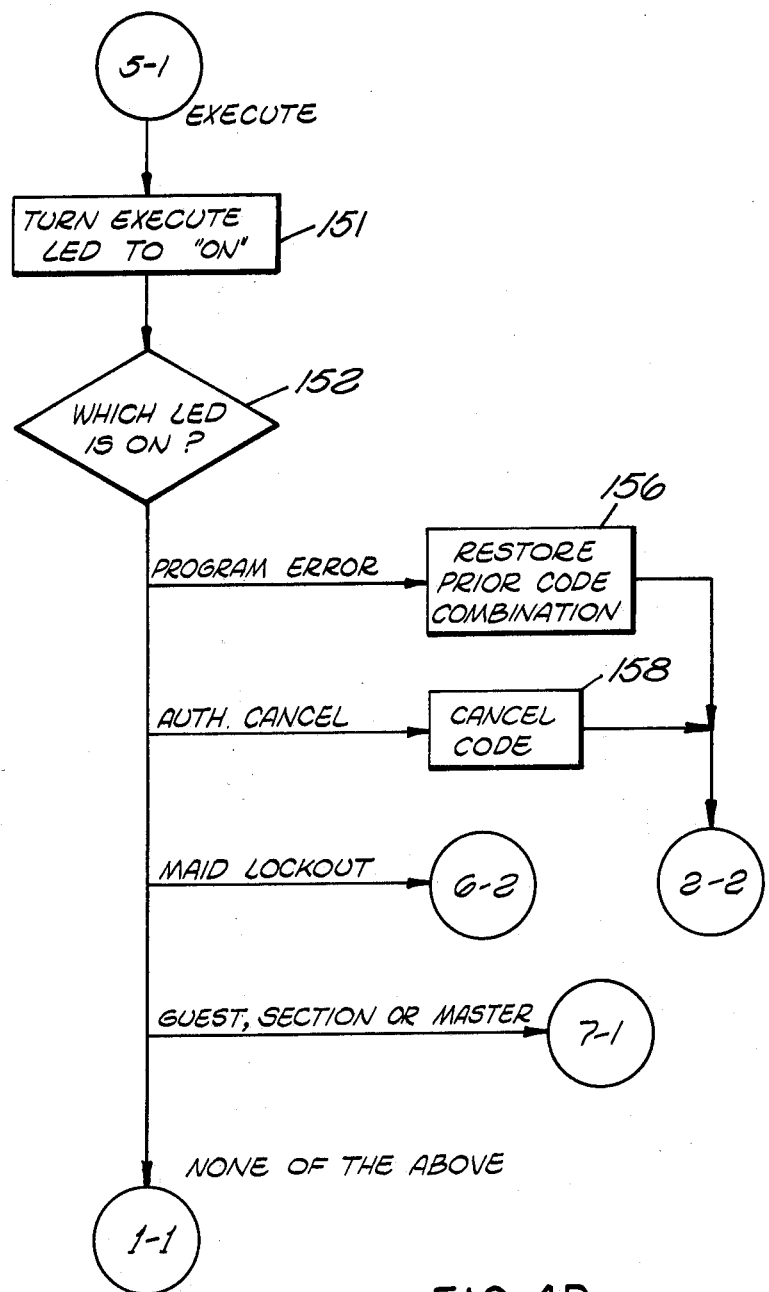

In the preferred embodiment, the specific switches which are scanned include a GUEST switch, a SECTION switch, a MASTER switch, a DUPLICATE switch, a PROGRAM ERROR switch, an AUTHORIZATION CANCEL switch, an AUTHORIZATION INITIATE switch, a MAID LOCK-OUT switch, and an EXECUTE switch. The scanning of these switches is indicated by the blocks 120, 128, 130, 122, 124, 134, 132, 126 and 151, respectively (FIGS. 4B, 4C and 4D). The indicator lights 38 indicate to the console operator which function is being performed. The processor, by setting one or more flip flops for example, keeps track of which function switches are depressed and thus which indicator lights are on.

In the preferred embodiment, a higher level of authorization will be required to activate the processor to encode a TSOM or key card with the SECTION or MASTER switches (blocks 128 and 130), or to activate the processor in response to the AUTHORIZATION INITIATE or AUTHORIZATION CANCEL panel switches (blocks 132 and 134). In order to provide this higher level authorization, a test is made (block 138 in FIG. 4C) to determine if authorization code combination inputted has been accorded a higher level authorization by, for example, comparing with a stored authorization code combination in a subset of authorization code combinations stored in the memory 24. If a sufficient level of authority does not exist, then the processor 20 instructs the printer 40 to record the attempted transaction in red (block 110) and the console is turned off (block 112).

After the appropriate indicator light 38 is turned on and it is determined that the authorization card has a sufficient level of authority, the processor 20 again scans the front panel switches (block 116). If no additional switches in the panel 42 have been depressed, the above described scanning procedure will continue until another switch is depressed.

If during the switch panel scanning, the processor detects that a CLEAR switch has been depressed, the scanning of the front panel (block 116) will stop and the processor will reinitiate the system by sequencing through the program commencing at the block 102 in the manner previously described.

It will be appreciated that the indicator lights remain on at least until the particular function to be performed has been completed. For example, in FIG. 4D, upon sensing that the EXECUTE switch has been depressed, the EXECUTE light in the light panel 38 (FIG. 2) is turned on (block 151). The processor 20 then scans the switch panel 42 to determine which switch is depressed (block 152). When the processor detects that the EXECUTE switch is closed the processor branches to and begins to perform an execute sequence (FIG. 4D).

If an error has been made in programming a key card or a TSOM with an incorrect lock code combination, the PROGRAM ERROR switch is depressed. Upon sensing that the PROGRAM ERROR light is on, the processor 20 first initiates several tests to determine if the proper function switches have been depressed. If they have been, then the prior lock code combination is restored in memory 22 (block 156). The printer then records the transaction (block 114) and the console 10 is turned off.

If the AUTHORIZATION CANCEL switch has been depressed then the authorization code combination stored at a memory address location identified, e.g., by inputting the address into the console via the keyboard 34, will be cancelled (block 158) by causing the validity bit to be permanently changed from a zero to a one. Again, upon completion of this operation, the printer 40 records the transaction and the console 10 is turned off.

It will be appreciated that the authorization code combinations may be stored in any type of memory. However, it is preferable to have the authorization code combination programmed in a permanent read-only memory at the factory. Such a permanent memory will not be subject to reprogramming at the console thus providing greater security.

Validity bit information may be stored utilizing a permanent type memory device such as a diode. For example, a console may be provided with a 64 word PROM for storing 64 authorization code combinations. A non-burned out diode would then be associated with each authorization code word address indicating that all the authorization codes were valid. A selected authorization code could then be invalidated by causing the associated diode to be burned out thereby causing the state of the validity bit to change. When all 64 of the diodes representing the validity bits have been burned out, a new 64 word PROM pre-programmed with 64 new authorization code combinations could be obtained from the factory to replace the old authorization code PROM. Of course, the new 64 word PROM would not have any of the validity bit diodes burned out. Alternatively, the validity bit could be a programmable bit to selectively validate or invalidate a selected authorization code combination.

Another advantage of the present invention is the ability to double lock the door from the outside thereby preventing the lock from being opened with a key card. This double locking function is provided by using the console to first appropriately program a TSOM with a proper security code combination if a security code combination is not already permanently stored in the TSOM. The TSOM is then inserted into the lock to activate the double lock switch. If the double lock is to be released, the TSOM must again be appropriately programmed with a security code combination by the console. The TSOM is then inserted into the lock to deactivate the double lock mechanism. The particular LOCK or UNLOCK function is selected using a switch means on the TSOM.

Figure 5:
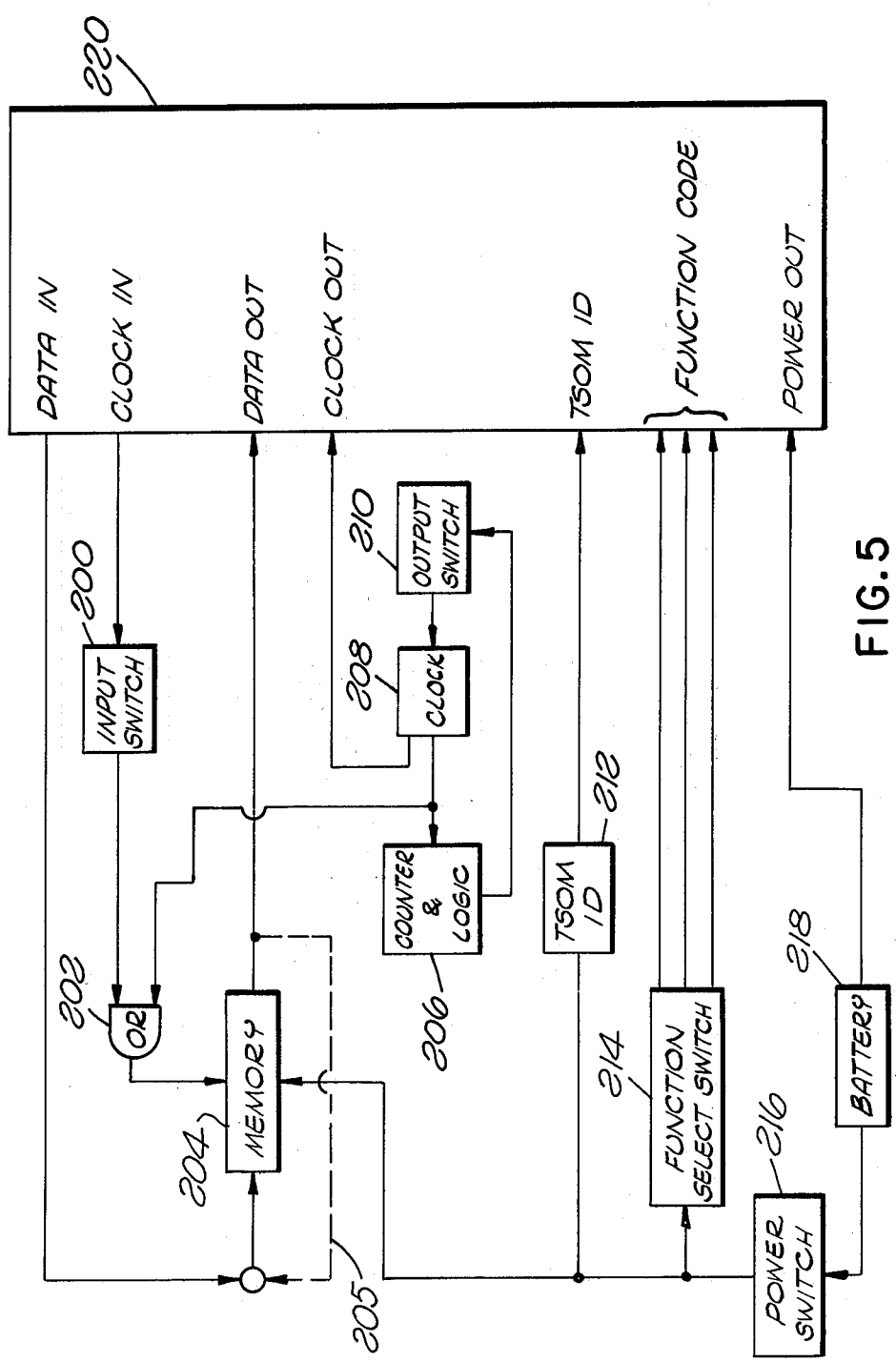
FIG. 5 is a block diagram of the elements of the TSOM of the system of this invention.

Referring again to the flow diagram of FIG. 4D, if the EXECUTE light and the MAID LOCKOUT lights are both on, then the above double lock activation or deactivation may be achieved as follows. Upon detecting that the EXECUTE and the MAID LOCKOUT switches have been depressed, the processor 20 initially determines whether a TSOM has been inserted in the security override module connector 30 (block 160, FIG. 4F). If it has not, then the printer 40 is instructed to record the transaction in red and the console power is turned off as previously described. If a TSOM has been inserted (block 160), the position of a TSOM function switch 214 (FIG. 5) is transmitted to the console processor 20. The console then determines if a corresponding panel switch has been depressed to enable the TSOM to be programmed with information from the console and thus enable the TSOM to perform the function indicated by the TSOM function switch 214 (FIG. 5).

For example, if the TSOM function select switch 214 is coupled to generate a binary code to UNLOCK the double lock and to LOCK the double lock, then the processor 20 may be programmed so that the MAID LOCKOUT panel switch must be depressed before the console will cause the TSOM to be programmed to perform either the UNLOCK the double lock or LOCK the double lock functions. If any other panel switch is depressed, the processor 20 will instruct the printer 40 to record the transaction in red indicating an aborted procedure. If the switch on the TSOM is in the LOCK or UNLOCK position (block 162), and the MAID LOCKOUT panel switch is depressed, the processor 20 next waits for the insertion of a room number or a memory address number through the keyboard 34 (block 164 in FIG. 4F). If the room number inserted via the keyboard 34 is invalid, then the processor 20 again instructs the printer 40 (block 110 in FIG. 4A) to record the output transaction in red and the console is turned off (block 112 in FIG. 4A). If the room number is valid, the security code combination for that room is transferred from the non-volatile code combination memory 22 through the processor 20 to the security override module connector 30 and is stored in a TSOM memory to be described hereafter. The processor 20 then instructs the printer 40 to record the transaction in black (block 114) indicating that the transaction has been completed.

It will be appreciated, therefore, that the console receives a function code combination from the TSOM inserted therein. The TSOM will be programmed with a security code combination only if a function code combination is recognized and accepted by the console according to a predefined programmed test.

For example, if the function code combination indicates that the TSOM is to perform the OPEN function, the console will detect function code combinations corresponding thereto and will program the TSOM with an appropriate security code combination. If the TSOM function switch is set to generate one of the other function code combinations, an appropriate panel switch (e.g., the MAID LOCKOUT, GUEST, SECTION or MASTER switches) must also be depressed before the console will accept the function code combination and program a TSOM with a security code combination and, when necessary, a lock code combination.

Figure 4E:
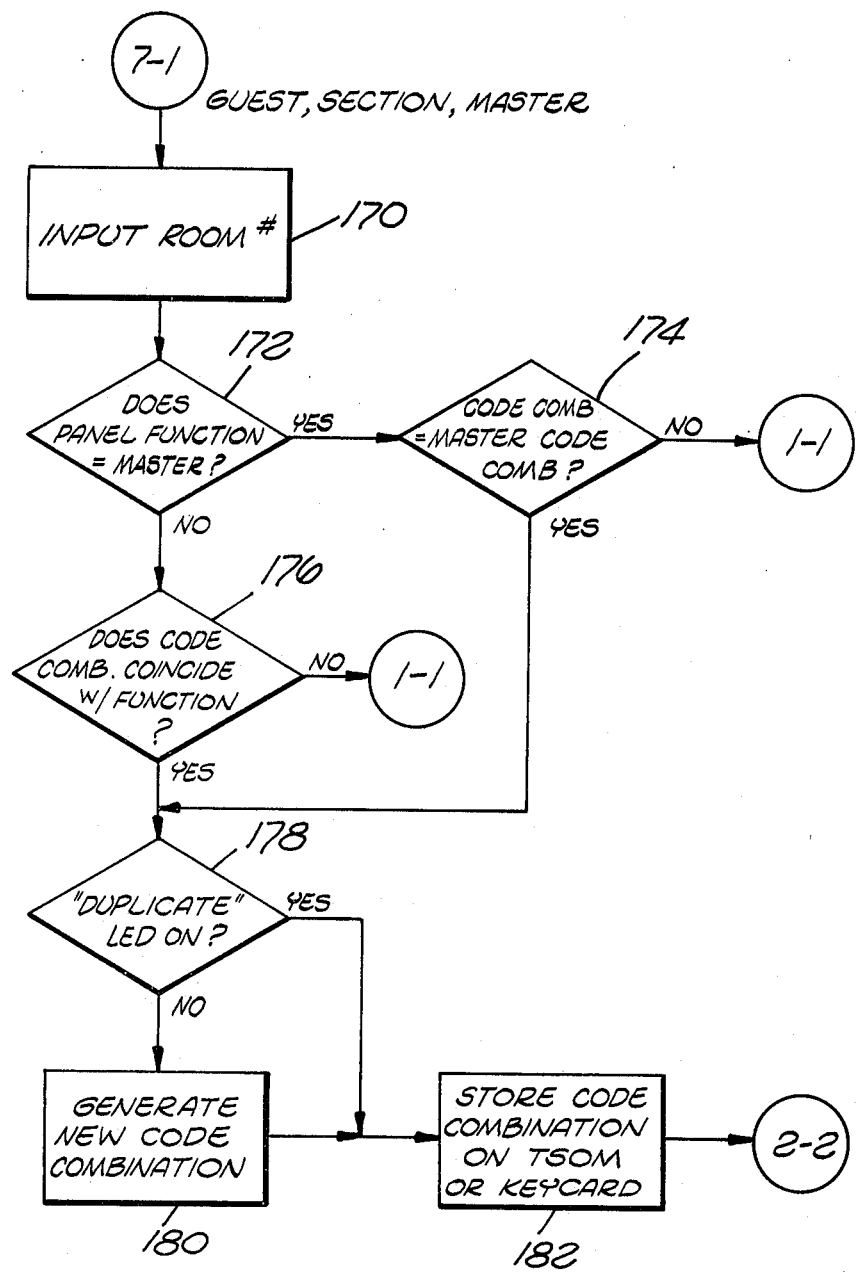

Referring to FIG. 4E, when the GUEST, STATION, or MASTER switch is depressed and the EXECUTE switch is also depressed, the processor 20 first waits for input data, such as a room number, from the keyboard 34 (block 170 of FIG. 4E). As previously indicated, the inputted data, such as the room number, is converted to an address of the non-volatile code combination memory 22, at which address a unique lock code combination is stored.

Once the code combination corresponding to the inputted room number has been obtained from the memory 22, the processor 20 first determines if the MASTER switch has been depressed, thereby indicating that a key card or TSOM is to be programmed with the MASTER code combination. If such is the case, then the lock code combination obtained from the memory location addressed by the inputted room number, is tested (block 174) to determine if it corresponds to a pre-set MASTER lock code combination value. For example, in the preferred embodiment, if it is desired to program a MASTER key card, the number inputted through the keyboard will not correspond to any particular room number but will be a pre-set number corresponding to a memory address (from memory 22) in which a lock code combination is stored corresponding to the lock code combination stored in the master memory of all locks.

If the lock code combination obtained from the memory location specified by the inputted "room number" does not correspond to the lock code combination stored in the master memory of all the locks then the processor instructs the printer 40 to record the transaction in red and the console is turned off.

In operation, the above test can be accomplished by accessing the master lock code combination whenever the MASTER switch is depressed and then comparing that value against the value of the lock code combination stored at the memory address accessed by the number inputted by operator via the keyboard. If correspondence exists then the test is satisfied. If correspondence does not exist then the test is failed and the console turns off.

The above procedure thus provides a two level test since not only must the authorization code combination inputted have a particular value (block 138, FIG. 4C) but the operator must know the number which must be inputted via the keyboard 34 to access the location in the processor memory in which the master lock code combination is stored.

If the function is not the MASTER key card coding function, the inputted lock code combination is next tested (block 176) to determine if it has a binary number format or value which is consistent with the STATION or GUEST functions indicated by a light being lit on the light panel 38. For example, several locations in the memory 22 may be utilized to store STATION lock code combinations. If the SECTION function light of the light panel 38 is on, and the number inputted via the keyboard 34 identifies a memory location where a STATION code combination is stored, then the execution of the program by the processor 20 will continue. If no such identification occurs (block 176) then the processor first instructs the printer 40 to record the transaction in red and then generates a signal to turn off the console. Once the test made in block 174 or 176 has been completed with an affirmative response, the processor next scans the panel 38 to determine if the DUPLICATE switch has been depressed (block 178). If it is, then the lock code combination is simply transferred to, and stored on a key card or in the memory of a TSOM. If the DUPLICATE light is not on, the processor generates a new lock code combination by preserving part of the old lock code combination (e.g., one 16 bit field) and combining it with a newly generated portion of a code combination (also 16 bits) to form a new lock code combination.

Whether the lock code combination is old or newly generated, the processor transfers that lock code combination to a TSOM through the security override module connector 30 or generates a key card in the key card generator 32 (block 182). Thereafter, the processor 20 instructs the printer 40 to record the transaction in black indicating that the command operation has been successfully completed (block 114).

Of course, it will be appreciated that the flow diagram described in conjunction with FIGS. 4A through 4F is illustrative only.

In the preferred embodiment, the processor will also automatically clear itself.

Referring now more particularly to FIG. 5, there is illustrated a block diagram of a TSOM which is adapted to be programmed by the console 10 to open the lock, to lock the double lock, to unlock the double lock, to store a lock code combination in the guest memory of the lock, to store a lock code combination in the station memory of the lock, or to store a lock code combination in the master memory of the lock. Although all of these functions could be performed by a single TSOM utilizing an appropriate function select switch, in the preferred embodiment, two or more different TSOMs, each capable of performing only a subset of the set of possible functions, are utilized to enhance the security of the system and decrease the possibility of unauthorized entry into a room.

The block diagram of FIG. 5 may be utilized to represent all the TSOMs and comprises a connector 220 which is adapted to be inserted both into the security override module connector 30 on the console 10 (FIG. 2) and into the lock connector 70 (FIG. 3) to transfer data from the console to the lock. Initially, a power switch 216 is turned on to allow information to be inputted to a volatile memory 204 through the DATA IN connector lead. A battery 218 is coupled to supply power to the internal components of the TSOM. In addition, power is coupled from the battery to the connector 220 to allow power to be supplied to the lock in a situation where the power supply of the lock is inoperative.

If the power switch 216 is on and the TSOM is inserted in the connector 30 (FIG. 2), activation of an input switch 200, coupled between a CLOCK IN lead of the connector 220 and the memory 204, causes code combination data to be serially shifted into the memory 204 through the DATA IN lead under the control of an input clock signal provided by the console. When the code combination data have been shifted into the memory 204 any one of a number of mechanisms may be utilized to turn off the input switch 200 or otherwise prevent additional data from being received by the TSOM.

For example, counter and logic circuitry 206 may be coupled (not shown) to count the input clocks and generate a signal when the count has reached the maximum number of bits to be input into the memory 204. A control signal would then be generated to turn off the input switch 200.

Once a code combination has been stored in the memory 204, the power switch 216 remains on after the TSOM is removed from the console and until the information in the memory 204 has been transferred to an appropriate lock or locks.

In order to provide added security and prevent unauthorized multiple use of a TSOM, the memory 204 may be arranged so that its contents will not be restored once they are read out. Thus, the TSOM will be able to be used only once after being programmed by the console. Since access to the console is more difficult and in any event will be recorded by the printer, added security is provided.

If multiple use is desired without reprogramming at the console, a lead 205 may be connected from the output to the input of the memory 204 so that the data will be shifted back into memory and stored as it is read out.

A function select switch 214 is also provided to select a particular function to be performed by the TSOM upon insertion into the lock. The function select switch 214 may, for example, be a switch which selects one of several 3 bit function codes, stored by hard wired connection to either ground or +5 volts. By turning the function select switch 214 to one position, a 3 bit code, for example 101, may be selected indicating that the TSOM is to perform an OPEN function. On the other hand, the function select switch may be turned to a different position to select a different 3 bit code, for example 110, indicating that the function to be performed is to LOCK the double lock. In a similar manner, each of the remaining functions has a unique 3 bit binary function code combination which is recognized by the control logic and timing 56 (FIG. 3) in each of the locks to allow each of the locks to perform the particular function indicated by that code.

The function select switch 214 may also generate the 3 bit function code combination for the processor 20 so that the processor can test to be sure that an authorized function exists so as to allow the processor to transfer data in to the memory 204 when the input switch 200 is activated (see, for example, blocks 172 and 175 in FIG. 4E). If the function code, as defined by the function select switch 214, is not consistent with the function to be performed by the console as defined by the depressed state of one of the switches 42 (FIG. 2), then, as previously discussed, the processor 20 will instruct the printer 40 to record the transaction in red and then turn off the console.

In order for data to be transferred from the processor 20 to the TSOM memory 204, the console 10 must recognize that a TSOM has been inserted into the connector 30. To provide this indication, a TSOM identification circuit 212 is provided to generate an appropriate one bit code which may be either a one or zero, to indicate that the module inserted in the connector 30 is indeed a TSOM module. Again, if the signal on the appropriate lead of the connector 220 does not have the proper level, the processor 20 will detect that condition and will instruct the printer 40 to record the transaction in red and then turn off the power to the console.

Once code combination data have been stored in the memory 204, the TSOM is withdrawn from the connector 30 of the console 10 and is taken to the lock of a room where the TSOM is inserted in the lock connector 70 (see FIG. 3). An output switch 210 coupled to a clock generator 208 is then depressed activating a clock signal. The clock generator 208 is coupled to the memory 204 via an OR gate 202 which has another input coupled to the CLOCK IN terminal of the connector 220. Activation of the clock 208 causes the data in the memory 204 to be shifted out on the DATA OUT lead of the connector 220. The clock generator 208 is also coupled to the counter and logic circuitry 206 which counts the number of clock pulses generated by the clock 208. When the number of clock pulses that have occurred equals the number of data bits stored in the memory 204, the counter and logic circuitry 206 generates a signal which may either turn off the output switch 210 or turn off the clock 208 directly. In order to provide appropriate synchronization, the clock signal from the clock generator 208 is also outputted to the lock via the CLOCK OUT lead of the connector 220.

As previously mentioned, two or more, for example, four different TSOM modules are preferred: One TSOM to open the lock and to lock or to unlock the double lock, and one each TSOM for transferring a new lock code combination to the master memory, the guest memory or the station memory of the lock. With respect to the first TSOM described above, only the security code combination is inputted to the memory 204. Thus, the memory 204 need be only 32 binary bits long. However, in order to provide uniformity of design, the memory 204 in the above described TSOM is preferably a register 64 bits long. Thus, when the data are shifted out to the lock, the 32 bit security code combination must first be shifted through 32 memory bits if the data are shifted out in a serial fashion. In such a configuration, the counter and logic block 206 is configured to shift the 32 bit security code combination into the first 32 bits of the memory 204 and then provide appropriate commands to shift the data through the remaining 32 bits of the memory 204 prior to outputting the data to the lock through the connector 220. Thus, the counter and logic block 206 consists simply of a counter capable of counting to 64, and logic which generates enabling or disabling pulses when specified count values occur during the counting process. It will, of course, be appreciated that while the data are being shifted through the second 32 bits of the memory 204 prior to being outputted to the lock, the counter and logic 206 will inhibit the clock signal from being outputted to the lock through the CLOCK OUT lead of the connector 220.

The TSOM utilized to open the lock or lock or unlock the double lock is also provided with a function select switch 214 which has only 3 positions thereby preventing a function code operable to cause a code combination to be stored in the master, guest or station memories from being generated.

The embodiment of the TSOM whose function is to transfer a new code combination into the master memory, the guest memory or the station memory is useful in situations where a lock code combination stored in the lock has gotten out of synchronization and thus does not correspond to the lock code combination stored in the memory 22 of the downstairs console 10. Such an out-of-sync condition can easily occur if the contents of the console memory or lock memory are altered as when power is lost or other electronic failure occurs. A lock and the console may also get out-of-sync when a guest uses only one or at least less than all of the entrances in a suite having several entrances or when a guest is not required to use his key card to enter his room because a maid is in the room and the room is thus already opened.

In operation, a 32 bit security code combination is serially shifted into the memory 204 of the TSOM when the switch 210 is activated. The TSOM will then receive a second 32 bit lock code combination to be stored in either the master memory, the guest memory or the station memory. The appropriate binary function code combination on the function code leads as selected by the function select switch 214, will then command the lock to transfer the lock code combination to one of the alterable memories 58, 60 or 62, provided, of course, that the initial 32 bit security code combination transferred to the lock corresponds to the security code combination stored in the security memory 72 of the lock.

By way of example, if it is desired to update the station memory lock code combination in a particular lock, the TSOM connector 220 of a TSOM having the desired capability, is inserted into the connector 30 of the downstairs console. The power switch 216 of the TSOM is switched on and the function select switch 214, if the TSOM is capable of performing more than one function, set to instruct the lock to store a lock code combination in the station memory of the lock. Upon entering a room number or other appropriate number identifying the address of the memory cell containing the desired lock code combination through the keyboard 34, and inserting the proper authorization code, an appropriate security code combination and lock code combination will be transferred from the console memory to the TSOM over the DATA IN lead. The security code combination and the lock code combination are then stored in the TSOM memory 204. When the TSOM is carried to the appropriate lock and inserted into the lock's connector 70, the TSOM function control switch is set to enable the updating of the lock's station memory. The TSOM then operates to first transfer the security code combination into the lock. If the security code combination transferred to the lock corresponds to the security code combination stored in the security memory 72 of the lock, the lock will accept the lock code combination for the selected alterable memory.

Figure 6:
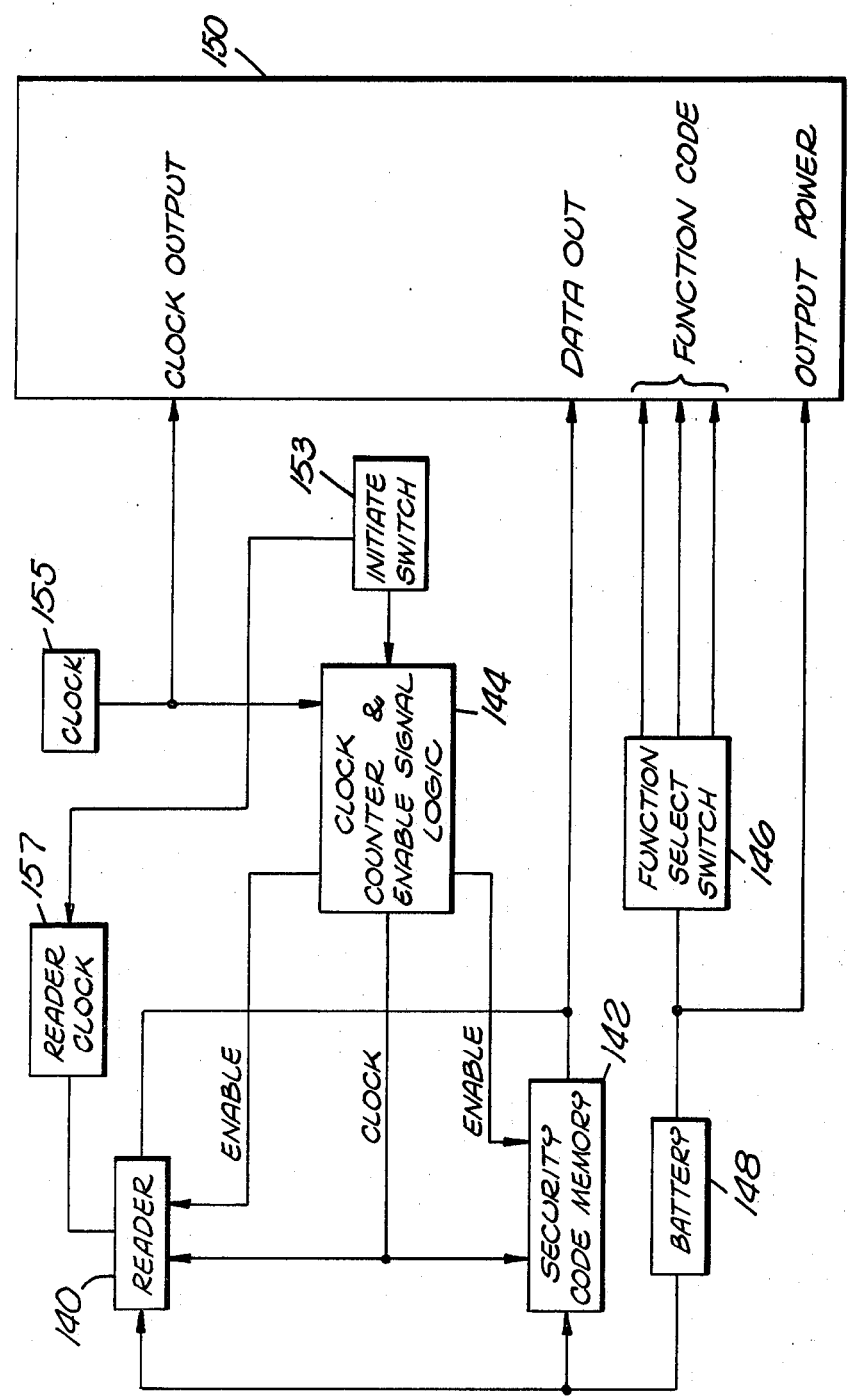
FIG. 6 is a block diagram of the elements of the PSOM of the system of this invention.

The elements of the PSOM are shown in the block diagram of FIG. 6. Unlike the TSOM, the PSOM is operated as a self-contained unit independent of the central console, although it is an integral part of the entire security system of the present invention. The PSOM comprises a card reader 140 and a fixed security code memory 142 as well as counter and enable signal logic circuitry 144. The PSOM further comprises a battery 148 which provides power to the counter and logic circuitry 144. The battery 148 may also supply power to the lock through the output power lead of a connector 150 in the event the power supply of the lock is disabled. A function select switch 146 generates a three bit binary function code on three leads also connected to the connector 150 in the manner previously described in conjunction with the TSOM.

The security code combination from the security code memory and the lock code combination read from a key card in the reader 140 are transferred from the PSOM to the lock along the DATA OUT lead coupled to the connector 150. The function code combination may command the lock to either update the master, station, or guest memories of the lock; or OPEN the lock, or LOCK or UNLOCK the double lock as previously described in conjunction with the TSOM. When the OPEN, LOCK or UNLOCK functions are specified, the reader 140 will not read a key card. The DATA OUT lead will thus only transfer a security code combination.

More specifically, the PSOM is first inserted into the appropriate connector 70 of the lock as shown in FIG. 3. An initiate switch 153 is depressed which enables a clock counter in the counter and logic circuitry 144 to commence counting clock pulses generated by a clock 155. Alternatively, the initiate switch may actually activate the clock 155. The initiate switch 153 also activates a high speed reader clock 157 which enables the reader 140 to read a key card upon the appropriate enable signal from the counter and logic circuitry 144. The data so read may be shifted into the lock along the DATA OUT lead.

Initially, upon commencing counting of clock signals from the clock 155, the counter and logic circuitry 144 generates an enable signal which is coupled to the security code memory 142 thereby causing the permanently stored security code combination to be read out on the DATA OUT lead of the connector 150.

In the preferred embodiment, the security code combination will be a single code combination for an entire hotel with the security code combination being read out on the DATA OUT line in serial fashion during the first 32 clocks counted by the counter and logic circuitry 144. Of course, multiple security code combinations may be stored in the PSOM to provide a separate security code combination for each lock or for various groups or sets of locks.

After the security code memory 142 has been read, the counter and logic circuitry 144 will enable the lock code combination to be outputted on the DATA OUT lead during the second 32 clock pulses generated by the clock 155. When the counter and logic circuitry 144 has reached a count of 64, a signal is generated which terminates operation of the PSOM by turning off, for example, the initiate switch 153 or otherwise disabling the enable signals generated by the counter and logic circuitry 144.

In operation, the PSOM connector 150 is inserted into a connector 70 in the lock, the PSOM is turned on, and the function select switches 146 are set to generate a selected function code combination. If it is desired to change the guest, station or master memory lock code combination, a card must be inserted into the PSOM reader 140. If the lock recognizes the security code combination from the PSOM, the indicated function will be performed.

The operation of the PSOM is very similar to that of the TSOM except that the PSOM, as previously described, has a fixed memory containing the security code combinations and receives any necessary lock code combination information from a card inserted into the PSOM card reader 140. Thus, the PSOM may be used, for example, to insert entirely new lock code combinations into any lock. This is especially useful where the central console becomes inoperable. In such a situation, a number of previously coded key cards may be used by the PSOM to operate any of the locks. Specifically, a previously encoded card may be inserted into the PSOM reader 140 and the PSOM inserted into one of the locks having a security code combination corresponding to the security code combination stored in the PSOM security code memory 142. The proper PSOM function is selected, the PSOM is inserted into the lock, and the entirely new lock code combination from the card transferred into the selected memory of that lock. The card may then be withdrawn and handed to the room occupant. When the central console once again becomes operative, either the PSOM or TSOM may be used to bring that lock back into synchronization with the central console, as previously described.

In one embodiment of the invention, a plurality of security code combinations may be employed so that a person who knows one security code combination will only be able to gain access to the limited number of locks with that security code combination. In order to provide this added security, the PSOM stores many different security code combinations in its security code memory 142. Each security code combination is then stored in the security memory of one or more individual locks in the facility. In addition, the central console 10 stores the same group of security code combinations associated with each lock in its memory 22. The central console can thus load the TSOM with the appropriate security code combination for the individual lock desired. A keyboard or other selection means may then be provided on the PSOM so that a selected security code combination can be inputted to the lock.

The security system described above is preferred in hotels with large numbers of rooms. However, when the system is used for small hotels with small numbers of locks, the console can be eliminated. A set of prepunched key cards will be provided in such an embodiment with the PSOM being utilized to input lock code combinations to individual locks. For example, in the above described simplified system, the PSOM will be used each time a lock code combination in a lock is to be altered by first selecting a key card from the set of prepunched cards provided from the factory. The PSOM is then inserted in a lock and a function code combination selected by turning a dial or other means on the PSOM. The function code combination will identify the particular alterable memory into which the lock code combination is to be stored. The key card is then inserted into the PSOM reader which reads the lock code combination stored thereon and transfers it to the selected alterable memory of the lock. The key card can thereafter be used to open the lock without the use of a PSOM.

It will be appreciated that a TSOM will be more secure than a PSOM since it must be programmed, optionally after each use, by the console. Thus, the possibility of unauthorized use is decreased since, at the least, a valid authorization card is required, and in certain applications, other information must also be inputted through the console keyboard.

By contrast, the PSOM is self contained and does not require programming by the console. Thus, to assure that improper use will not occur, the PSOM must be kept in a safe or other limited access area.

It will be appreciated that a unique security system is provided by this invention for use with electronic locks. Various modifications and variations from the present embodiments are possible in light of the teaching contained herein, and the present invention can be practiced in a variety of manners, all without departing from the actual scope of the invention.

We claim:
1. A security system comprising:
a plurality of electronic locks each for performing, at any one time, one from a set of lock functions, each lock comprising:
a security memory for storing a security code combination,
at least one alterable memory for storing a lock code combination,
first receiving means for receiving a security code combination and a function code combination representative of one from the set of lock functions, and for receiving a lock code combination,
second receiving means for receiving a lock code combination,
first comparing means for generating a first enable signal when the security code combination received by the first receiving means corresponds to the security code combination stored in the security memory,
enabling means responsive to the occurrence of the first enable signal for enabling the lock to perform a lock function corresponding to the selected function code combination received by the lock, and
second comparing means for comparing the lock code combination received by the second receiving means against the lock code combinations stored in the alterable memories and generating a second enable signal coupled to open the lock when correspondence occurs according to a first selected criterion, and generating a third enable signal coupled to alter the value of the lock code combinations stored in one of the alterable memories when correspondence occurs according to a second selected criterion;
at least one key card for being encoded with a lock code combination and further adapted for being received by the second receiving means for transferring the lock code combination from the key card to the lock;
first, self-powered, portable means for transferring lock code combinations, function code combinations and security code combinations to the lock through the first receiving means of a lock comprising:
first connector means for being selectively interconnected with the first receiving means of the locks,
first function code combination generation means for outputting a selected function code combination through the first connector means, and
first memory means for storing at least one security code combination and selectively storing at least one lock code combination, the security code combination and the lock code combination being transferred into and out from the first memory through the first connector means;
a second, self-powered, portable means for transferring lock code combinations, function code combinations and security code combinations to a lock through the first receiving means, the second portable means comprising:
second connector means for being selectively interconnected with the first receiving means of the electronic locks, second function code combination generation means for outputting a selected function code combination through the second connector means;

second memory means for storing at least one security code combination, the security code combination being transferred out from the second memory through the second connector means, and reading means for reading a lock code combination from one of the key cards and transferring the lock code combination so read through the second connector means to the lock; and central means comprising:
connector means for interconnecting the first portable means to the central means, means for selectively transferring at least a security code combination to the first portable means through the first connector means of the first portable means, and means for selectively encoding the key card with a lock code combination.

2. In the security system of claim 1, the central means further comprising:
third memory means for storing a plurality of authorization code combinations,
access means for receiving an authorization code combination and enabling the central means when there is correspondence between the received authorization code combination and one of the authorization code combinations stored in the third memory means.

3. In the security system of claim 1 or claim 2 the central means further comprising:
fourth memory means for storing at least one security code combination and for storing the lock code combination of each alterable memory of each lock.

4. The security system of claim 3 wherein the central means further comprises:
means for selectively generating a new lock code combination for a specified one of the alterable memories of one of the locks and storing the new lock code combination in the fourth memory means.

5. The security system of claim 1 wherein each electronic lock further comprises:
double lock means responsive to the first enable signal and to a first selected one of the function code combinations for rendering the lock unresponsive to a lock code combination received by either the first or second receiving means, the double lock means being further responsive to the first enable signal and a second selected one of the function code combinations for rendering the lock responsive to such lock code combination.

6. The security system of claim 5 wherein each lock is operable for performing the functions of directly opening the lock, activating the double lock means, deactivating the double lock means, and selectively storing a lock code combination in one of the alterable memories, the function to be performed being determined by the function code combination received.

7. The security system of claim 1 wherein the first self-powered portable means further comprises power supply means for supplying power to the electronic lock when the first connector means is interconnected to the first receiving means of the electronic lock.

8. The security system of claim 1 wherein the second self-powered portable means further comprises power supply means for supplying power to the electronic lock when the second connector means is interconnected to the first receiving means of the electronic lock.

9. The security system of claim 1 wherein the first self-powered portable means further comprises erasing means for erasing the security code combination and lock code combination contents of the first memory means of the first self-powered portable means after the contents of the first memory means are transferred from the first memory means to the electronic lock.

10. The security system of claim 1 wherein the first self-powered portable means further comprises means for retaining the security code combination and the lock code combination contents of the first memory means when the contents of the first memory means are transferred from the first memory means to the electronic lock.

11. The security system of claim 1 or claim 2 wherein the central means further comprises means for recording a selected set of data each time either the means for selectively transferring or the means for selectively encoding is activated.

12. A security system comprising:
a plurality of electronic locks each operable for performing at any one time, one from a set of lock functions, each lock comprising:
a security memory for storing a security code combination,
at least one alterable memory for storing a lock code combination,
first receiving means for receiving a security code combination and a function code combination representative of one from the set of lock functions, and for receiving a lock code combination,
second receiving means for receiving a lock code combination,
first comparing means for generating a first enable signal when the security code combination received by the first receiving means corresponds to the security code combination stored in the security memory,
enabling means, operable in response to the first enable signal, for selecting and enabling one of the set of lock functions to be performed by the lock, dependent upon the function code combination received by the lock, wherein the lock receives the lock code combination only when one of a selected subset of function code combinations is received by the lock,
second comparing means for comparing the lock code combination received by the second receiving means with the lock code combinations stored in the alterable memories and generating a second enable signal, the lock opening in response to the second enable signal when correspondence occurs according to a first selected criterion, and generating a third enable signal coupled for altering the lock code combination stored in one of the alterable memories when correspondence occurs according to a second selected criterion, and
double lock means responsive to the first enable signal and to a first selected one of the function code combinations for activating the double lock means for rendering the lock unresponsive to a lock code combination received by either the first or second receiving means, the double lock means being further responsive to the first enable signal and a second selected one of the function code combinations for deactivating the double lock means;

at least one key card for being encoded with a lock code combination and further adapted for being received by the second receiving means for transferring the lock code combination from the key card to the lock;

first, self-powered, portable means for providing the lock code combinations, function code combinations and security code combinations to the first receiving means of the lock, comprising:

first connector means adapted for being selectively interconnected with the first receiving means of the locks, first function code combination generation means for selecting and outputting one function code combination through the first connector means, and first memory means for storing at least one security code combination and selectively storing at least one lock code combination, the security code combination and the lock code combination being transferred into and out from the first memory through the first connector means, a second, self powered, portable means adapted for transferring lock code combinations, function code combinations and security code combinations to the lock through the first receiving means, the second portable means comprising:

second connector means adapted for being selectively interconnected with the first receiving means of the locks, second function code combination generation means for selecting and outputting one function code combination through the second connector means;

second memory means for storing at least one security code combination, the security code combination being transferred out from the second memory through the second connector means, and reading means for reading a lock code combination from one of the key cards and transferring the lock code combination so read through the second connector means to the lock; and central means comprising:

third memory means for storing a plurality of authorization code combinations, access means for receiving an authorization code combination and enabling the central means when correspondence between the received authorization code combination and one of the authorization code combinations stored in the third memory means exists, fourth memory means for storing at least one security code combination and for storing the lock code combination of each alterable memory in each lock, means for selectively generating a new lock code combination for a specified one of the alterable memories of one of the locks and storing the new code combination in the fourth memory means, third connector means for interconnecting the first portable means to the central means for selectively transferring at least one security code combination from the fourth memory to the first portable means to be stored thereby, the transferring occurring only when the central means is enabled by the access means, and means for selectively encoding the key card with a lock code combination from the fourth memory means, the encoding occurring only when the central means is enabled by the access means.

13. The security system of claim 12 wherein each lock selectively performs the functions of directly opening the lock, activating the double lock means, deactivating the double lock means, and selectively storing a lock code combination in one of the alterable memories, the function performed being determined by the function code combination.

14. The security system of claim 12 wherein the first self-powered portable means further comprises power supply means for supplying power to the electronic lock when the first connector means is interconnected to the first receiving means of the electronic lock.

15. The security system of claim 12 wherein the second self-powered portable means further comprises power supply means for supplying power to the electronic lock when the second connector means is interconnected to the first receiving means of the electronic lock.

16. The security system of claim 12 wherein the first self-powered portable means further comprises erasing means for erasing the security code combination and lock code combination contents of the first memory means of the first self-powered portable means after the contents of the first memory means are transferred from the first memory means to the electronic lock.

17. The security system of claim 12 wherein the first self-powered portable means further comprises means for retaining the security code combination and the lock code combination contents of the first memory means when the contents of the first memory means are transferred from the first memory means to the electronic lock.

18. The security system of claim 12 or claim 13 wherein the central means further comprises means for recording a selected set of data each time either the means for selectively transferring or the means for selectively encoding is activated.

19. A self-powered portable means for use in a security system having a plurality of electronic locks, each electronic lock having a first memory means for storing a security code combination and alterably storing at least one lock code combination, the security system further having a central console for storing and selectively outputting the security code combination and for generating, selecting, storing and outputting lock code combinations, the self-powered portable means comprising second memory means for storing a security code combination and selectively storing a lock code combination;

connector means for selectively interconnecting the self-powered portable means to the central console for receiving and storing the security code combination in the second memory means and selectively receiving and storing the lock code combination in the second memory means, and for selectively interconnecting the self-powered means to one of the locks for outputting the stored contents of the second memory means to the one lock; and means for enabling the receiving and outputting of the security code combination and the lock code combination through the connector means.

20. The self-powered portable means of claim 19 further comprising:
function code combination generation means for generating a function code combination, the function code combination being outputted from the self-powered portable means through the connector means for identifying one from a set of lock functions to be performed by the lock, the lock being responsive to the function code combination for performing the identified lock function.

21. A security system comprising:
a plurality of electronic locks each for performing, at any one time, one function from a set of lock functions, each lock comprising first memory means for storing a security code combination and alterably storing at least one lock code combination;
a central console for storing and selectively outputting security code combinations and for generating, selecting, storing and selectively outputting lock code combinations; and
at least one self-powered portable means each comprising:
second memory means for storing a security code combination and selectively storing a lock code combination;
connector means for removably interconnecting the self-powered portable means to the central console for receiving the security code combination therefrom, the received security code combination being stored in the second memory means, and selectively receiving a lock code combination therefrom, the received lock code combination being stored in the second memory means, and for removably interconnecting the self-powered means to one of the locks for outputting the stored contents of the second memory means to the lock; and
function code combination generation means for generating a function code combination, the function code combination being outputted from the self-powered portable means through the connector means for identifying one from the set of lock functions to be performed by the lock, the lock being responsive to the function code combination for performing the identified lock function.

22. A self-powered portable means for use in a security system having a plurality of electronic locks, each electronic lock comprising a first key card reading means for receiving a key card having a lock code combination stored thereon and reading the lock code combination therefrom, first memory means for storing a security code combination and alterably storing at least one lock code combination, and comparing means for comparing the lock code combination on the card with the lock code combination in the first memory means for activating the lock when correspondence occurs between the inputted lock code combination and the lock code combination in the first memory means and for comparing a received security code combination with the security code combination stored in the first memory means for enabling the lock to perform at least one defined function when the received security code combination corresponds to the security code combination stored in the first memory means, the self-powered portable means comprising;
second memory means for storing at least one security code combination;
connector means for selectively interconnecting the self-powered portable means with one of the locks; and
means for outputting one of the security code combinations from the second memory means through the connector means for comparison in the comparing means of the lock with the security code combination stored in the first memory means to enable the lock to perform at least one defined function when the outputted security code combination corresponds to the security code combination stored in the first memory means.

23. The self-powered portable means of claim 22 further comprising erasing means for erasing the security code combination contents of the second memory means after the security code combination is outputted to the electronic lock.

24. The self-powered portable means of claim 22 further comprising means for retaining the security code combination contents of the second memory means after the security code combination is outputted to the electronic lock.

25. The self-powered portable means of claim 22 wherein each of the locks is adapted for performing, at any one time, one function from a set of lock functions upon receipt of a function code combination for said one lock function, the self-powered portable means further comprising:
function code combination generation means for generating a function code combination, the function code combination being outputted from the self-powered portable means through the connector means for identifying one from the set of lock functions to be performed by the lock.

26. The self-powered portable means of claims 22, 23, 24 or 25 further comprising manually operated means for selecting one of the security code combinations for being outputted through the connector means.

27. The self-powered portable means of claim 25 wherein said function code combination generation means includes manually operated means for selecting a function code combination for being outputted from the self-powered portable means.

28. A self-powered portable means for use in a security system having a plurality of electronic locks, each electronic lock comprising a first key card reading means for receiving a key card having a lock code combination stored thereon and reading the lock code combination therefrom, first memory means for storing a security code combination and alterably storing at least one lock code combination and comparing means for comparing the lock code combination on the card with the lock code combination on the first memory means for activating the lock when correspondence occurs between the inputted lock code combination and the lock code combination in the first memory means, said comparing means including means for comparing the security code combination in the first memory means with an applied security code combination, and combination changing means responsive to correspondence of the stored and applied security code combinations and to an applied lock code combination for storing said applied lock code combination at a selected location in the first memory means in place of a lock code combination stored thereat, the self-powered portable means comprising:

second memory means for storing at least one security code combination;

connector means for selectively interconnecting the self-powered portable means with one of the locks;

means for outputting one of the security code combinations from the second memory means through the connector means for comparison in the comparing means of the lock; and second key card reading means for receiving a key card having a lock code combination stored thereon; reading the lock code combination therefrom and outputting through the connector means the lock code combination read by the second key card reading means for storage in a selected location in the first memory means when the outputted security code combination corresponds to the security code combination stored in the first memory means.

29. The self-powered portable means of claim 28 wherein each of the locks is adapted for performing at any one time, one from a set of lock functions upon receipt of a function code combination for said one lock function, the self-powered portable means further comprising:

function code combination generation means for generating a function code combination, the function code combination being outputted from the self-powered portable means through the connector means for identifying one from the set of lock functions to be performed by the lock.

30. The self-powered portable means of claims 28 or 29 further comprising manually operated means for selecting one of the security code combinations for being outputted through the connector means.

31. The self-powered portable means of claim 29 wherein said function code combination generation means includes manually operated means for selecting a function code combination for being outputted from the self-powered portable means.

32. A security system comprising:

a plurality of key cards each having a lock code combination encoded thereon, a plurality of electronic locks, each lock comprising a first key card reading means for receiving one of the key cards and reading the encoded lock code combination therefrom, first memory means for storing a security code combination and alterably storing at least one lock code combination and comparing means for comparing the lock code combination stored in the first memory with the lock code combination on the key card; and self-powered portable means comprising:

second memory means for storing at least one security code combination;

connector mean for selectively interconnecting the self-powered portable means to one of the locks, and means for outputting one of the security code combinations from the second memory means through the connector means, the outputted security code combination being compared in the comparing means of the lock for enabling the lock to open when the outputted security code combination corresponds to the security code combination stored in the first memory means.

33. The self-powered portable means of claim 32 further comprising erasing means for erasing the security code combination contents of the second memory means after the security code combination is outputted to the electronic lock.

34. The self-powered portable means of claim 32 further comprising means for retaining the security code combination contents of the second memory means after the security code combination is outputted to the electronic lock.

35. The self-powered portable means of claim 32 wherein each of the locks is adapted for performing, at any one time, one from a set of lock functions upon receipt of a function code combination for said one lock function, the self-powered portable means further comprising:

function code combination generation means for generating a function code combination, the function code combination being outputted from the self-powered portable means through the connector means for identifying one from the set of lock functions to be performed by the lock.

36. The self-powered portable means of claims 32, 33, 34 or 35 further comprising manually operated means for selecting one of the security code combinations for being outputted through the connector means.

37. The self-powered portable means of claim 35 wherein said function code combination generation means includes manually operated means for selecting a function code combination for being outputted from the self-powered portable means.

38. A security system comprising:

a plurality of key cards each having a lock code combination encoded thereon;

a plurality of electronic locks, each lock comprising a first key card reading means for receiving one of the key cards and reading the encoded lock code combination therefrom, first memory means for storing a security code combination and alterably storing at least one lock code combination and comparing means; and at least one self-powered portable means comprising:

second memory means for storing at least one security code combination;

connector means for selectively interconnecting the self-powered portable means to one of the locks;

means for outputting one of the security code combinations from the second memory means through the connector means, the outputted security code combination being compared in the comparing means of the lock with the security code combination stored in the first memory means; and second key card reading means for receiving a key card having a lock code combination stored thereon and reading the lock code combination therefrom, and outputting through the connector means, the lock code combination read by the second key card reading means;

the outputted lock code combination being stored in a selected location in the first memory means when the outputted security code combination corresponds to the security code combination stored in the first memory means.

39. The self-powered portable means of claim 38 wherein each of the locks is adapted for performing, at any one time, one from a set of lock functions upon receipt of a function code combination for said one lock function, the self-powered portable means further comprising:

function code combination generation means for generating a function code combination, the function code combination being outputted from the self-powered portable means through the connector means for identifying one from the set of lock functions to be performed by the lock.

40. The self-powered portable means of claims 38 or 39 further comprising manually operated means for selecting one of the security code combinations for being outputted through the connector means.

41. The self-powered portable means of claim 39 wherein said function code combination generation means includes manually operated means for selecting a function code combination for being outputted from the self-powered portable means.

42. A self-powered portable means for use in a security system having a plurality of electronic locks, each electronic lock comprising a first key card reading means for receiving a key card having a lock code combination stored thereon and reading the lock code combination therefrom, first memory means for storing a security code combination and alterably storing at least one lock code combination, comparing means for comparing the lock code combination on the card with the lock code combination in the first memory means for activating the lock when correspondence between the inputted lock code combination and the lock code combination in the first memory means occurs, said comparing means including means for comparing the security code combination in the first memory means with an applied security code combination, and combination changing means responsive to correspondence of the stored and applied security code combinations and to an applied lock code combination for storing said applied lock code combination at a selected location in the first memory means in place of a lock code combination stored thereat, the self-powered portable means comprising:

second memory means for storing at least one security code combination and a lock code combination;

connector means for selectively interconnecting the self-powered portable means with one of the locks;

means for transferring one of the security code combinations from the second memory means through the connector means for comparison in the comparing means of the lock with the security code combination stored in the first memory means; and means for transferring the lock code combination from the second memory means for storage in a selected location in the first memory means replacing one of the lock code combinations stored at that selected location in the first memory means.

43. The self-powered portable means of claim 42 wherein each of the locks is adapted for performing, at any one time, one from a set of lock functions upon receipt of a function code combination for said one lock function, the self-powered portable means further comprising:

function code combination generation means for generating a function code combination, the function code combination being outputted from the self-powered portable means through the connector means for identifying one from the set of lock functions to be performed by the lock.

44. The self-powered portable means of claim 43 wherein said function code combination generation means includes manually operated means for selecting a function code combination for being outputted from the self-powered portable means.

45. The self-powered portable means of claim 42 further comprising:

function code combination generation means for generating a function code combination for identifying the location in the first memory means wherein the lock code combination from the second memory is to be stored, the function code combination being transferred to the lock through the connector means.

46. The self-powered portable means of claims 42, 43, 44 or 45 further comprising manually operated means for selecting one of the security code combinations for being outputted through the connector means.

47. The self-powered portable means of claims 42, 43, 44 or 45 further comprising erasing means for erasing the security code combination and lock code combination contents of the second memory means after the contents of the second memory means are transferred from the second memory means to the electronic lock.

48. The self-powered portable means of claim 47 further comprising manually operated means for selecting one of the security code combinations for being outputted through the connector means.

49. The self-powered portable means of claims 42, 43, 44 or 45 further comprising means for retaining the security code combination and the lock code combination contents of the second memory means when the contents of the second memory means are transferred from the second memory means to the electronic lock.

50. The self-powered portable means of claim 49 further comprising manually operated means for selecting one of the security code combinations for being outputted through the connector means.

* * * * *

UNITED STATES PATENT AND TRADEMARK OFFICE
CERTIFICATE OF CORRECTION

PATENT NO. : 4,283,710

DATED : August 11, 1981

INVENTOR(S) : Leonard J. Genest et al.

It is certified that error appears in the above—identified patent and that said Letters Patent is hereby corrected as shown below:

Column 3, line 42, "keycards" should read --key cards--; line 56, "stord" should read --stored--.

Column 5, line 35, after "14" insert --by itself--.

Column 6, line 65, "in" should read --is--.

Column 7, line 43, after "or" insert --in--.

Column 8, line 4, after "1978," insert -- now U.S. Patent No. 4,213,118, issued July 15, 1980,--.

Column 9, line 10, "combintion" should read --combination--.

Column 10, line 17, after "outside" insert a comma.

Column 11, line 43, "congtrol" should read --control--.

Column 12, line 2, "comparison" should read --match--; line 36, "inserted" should read --applied--.

Column 14, line 4, Step 1 of Sequence I should read --Compare $C_2$ with $M_2$ and $C_1$ with $M_1$--.

Column 17, line 22, change "in" to --by--.

Column 18, line 34, change "and" to --or--.

Column 21, line 51, change "175" to --176--.

UNITED STATES PATENT AND TRADEMARK OFFICE
CERTIFICATE OF CORRECTION

PATENT NO. : 4,283,710

DATED : August 11, 1981

INVENTOR(S) : Leonard J. Genest et al.

It is certified that error appears in the above—identified patent and that said Letters Patent is hereby corrected as shown below:

Column 26, line 30, change "against the" to --with at least one-- and change "combinations" to --combination--; line 31, change "the" to --said at least one-- and change "memories" to --memory--; line 35, change "the value of the" to --at least one--; line 36, change "combinations" to --combination--, after "in" insert --said at least--, and delete "of the"; line 37, change "ories" to --ory--; line 46, after "and" insert --at least one--, and change "combinations" to --combination--; line 63, after "and" insert --at least one--, and change "combinations" to --combination--.

Column 27, line 4, change the semicolon to a comma.

Column 28, line 55, change "the" to --at least one--, and change "combinations" to --combination--; line 56, change "the" to --said at least one--, and change "memories" to --memory--; line 61, change "the" to --at least one--; line 62, after "in" insert --said at least--, delete "of the", and change "memories" to memory--.

Column 29, line 14, after "and" insert --at least one--, and change "combinations" to --combination--; line 31, after "and" insert --at least one--, and change "combinations" to --combination--.

Column 31, line 24, delete "each".

Column 33, line 56, change "mean" to --means--.

UNITED STATES PATENT AND TRADEMARK OFFICE
CERTIFICATE OF CORRECTION

PATENT NO. : 4,283,710

DATED : August 11, 1981

INVENTOR(S) : Leonard J. Genest et al.

It is certified that error appears in the above—identified patent and that said Letters Patent is hereby corrected as shown below:

Column 34, line 37, after "combination" insert a comma.

Signed and Sealed this

Twenty-fifth Day of January 1983

[SEAL]

Attest:

GERALD J. MOSSINGHOFF

Attesting Officer

Commissioner of Patents and Trademarks